United States Patent
Tsujimura et al.

(10) Patent No.: US 7,986,345 B2
(45) Date of Patent: Jul. 26, 2011

(54) IMAGE PICKUP APPARATUS, IMAGE PROCESSING METHOD, AND PROGRAM

(75) Inventors: Takashi Tsujimura, Tokyo (JP); Takuro Enomoto, Kanagawa (JP); Masatsugu Fukunaga, Kanagawa (JP); Daisuke Miyakoshi, Kanagawa (JP); Nobuho Ikeda, Kanagawa (JP); Manabu Kubo, Tokyo (JP); Kyoko Fukuda, Kanagawa (JP); Yutaka Yoneda, Kanagawa (JP); Tomoki Numata, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/750,035

(22) Filed: Mar. 30, 2010

(65) Prior Publication Data

US 2010/0182443 A1 Jul. 22, 2010

Related U.S. Application Data

(63) Continuation of application No. 11/595,776, filed on Nov. 10, 2006, now Pat. No. 7,719,572.

(30) Foreign Application Priority Data

Nov. 11, 2005 (JP) ................................. P2005-327371

(51) Int. Cl.
*H04N 5/225* (2006.01)
(52) U.S. Cl. .................................................. 348/220.1
(58) Field of Classification Search ................. 348/220.1
See application file for complete search history.

(56) References Cited

U.S. PATENT DOCUMENTS

| 7,411,623 B2 * | 8/2008 | Shibutani ................. 348/333.02 |
| 7,719,572 B2 * | 5/2010 | Tsujimura et al. .......... 348/220.1 |
| 2004/0109067 A1 * | 6/2004 | Yokoi ........................ 348/220.1 |
| 2004/0189823 A1 * | 9/2004 | Shibutani ................... 348/231.1 |
| 2006/0038894 A1 * | 2/2006 | Chan et al. ................. 348/222.1 |

FOREIGN PATENT DOCUMENTS

| JP | 7-184093 A | 7/1995 |
| JP | 08-331496 A | 12/1996 |
| JP | 10-108121 A | 4/1998 |
| JP | 11-298783 A | 10/1999 |
| JP | 2001-060876 A | 3/2001 |
| JP | 2001-218159 A | 8/2001 |
| JP | 2001-245299 A | 9/2001 |
| JP | 2002-044531 A | 2/2002 |
| JP | 2004-080376 A | 3/2004 |
| JP | 2004-222118 A | 8/2004 |
| JP | 2005-051810 A | 2/2005 |
| JP | 2005-176102 A | 6/2005 |

* cited by examiner

*Primary Examiner* — James M Hannett
(74) *Attorney, Agent, or Firm* — Lerner, David, Littenberg, Krumholz & Mentlik, LLP

(57) ABSTRACT

An image pickup apparatus having an image capturing unit capturing an image, a first recording unit temporarily recording an original image signal output from the image capturing unit, a processing unit performing predetermined signal processing upon the original image signal output from the image capturing unit, and an instructing unit instructing the processing unit to capture a still image. When the processing unit is instructed to capture a still image by the instructing unit while performing moving image signal processing upon the original image signal output from the image capturing unit, the processing unit may cause the first recording unit to record the original image signal output from the image capturing unit. In addition, the processing unit may read out the recorded original image signal from the first recording unit and perform still image signal processing upon the read out original image signal while suspending the moving image signal processing.

4 Claims, 14 Drawing Sheets

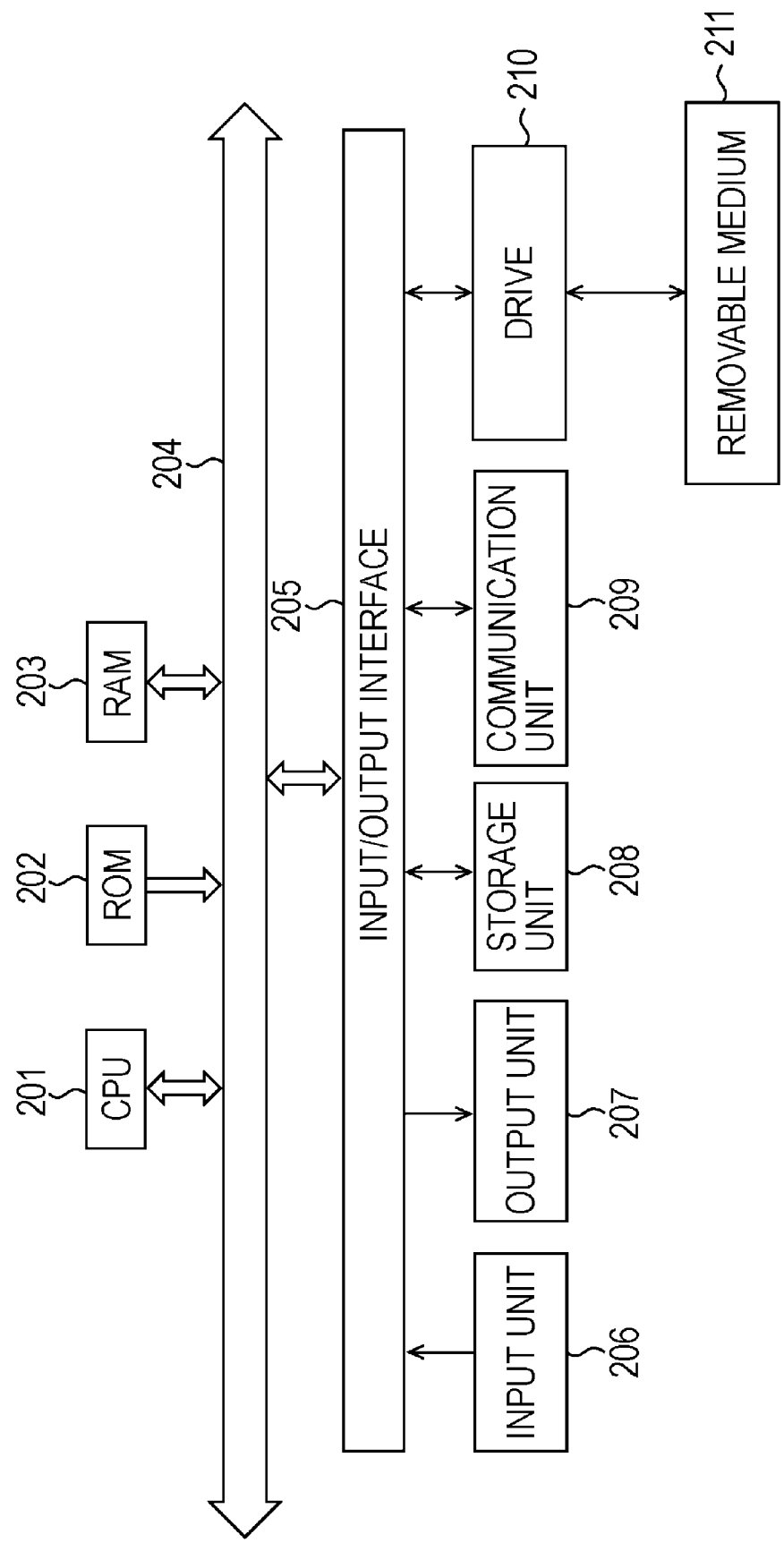

IMAGE PICKUP APPARATUS, IMAGE PROCESSING METHOD, AND PROGRAM

CROSS REFERENCES TO RELATED APPLICATIONS

This application is a continuation of U.S. application Ser. No. 11/595,776 filed on Nov. 10, 2006, which claims priority from Japanese Patent Application No. JP 2005-327371 filed on Nov. 11, 2005, the disclosures of both are hereby incorporated by reference herein.

BACKGROUND OF THE INVENTION

1. Field of the Invention

The present invention relates to image pickup apparatuses, image processing methods, and programs, and, more particularly, to an image pickup apparatus, an image processing method, and a program capable of capturing high-quality moving images and still images without requiring separate configurations for processing moving images and still images.

2. Description of the Related Art

Even if a digital still camera and a digital video camera have the same image capturing function, scanning formats adopted for an image pickup device included in the digital still camera and for an image pickup device included in the digital video camera are typically different from each other. A scanning format suitable for capturing still images is adopted for the image pickup device included in the digital still camera, and a scanning format suitable for capturing moving images is adopted for the image pickup device included in the digital video camera.

For example, an image pickup device having a few million pixels or more is used in digital still cameras that mainly capture still images. In order to record high-resolution still images using such an image pickup device, the sequential scanning (progressive format) in which scanning is performed every 1/30 second or more is adopted for the image pickup device.

On the other hand, as a scanning format for an image pickup device used in digital video cameras that mainly capture moving images, the interlaced scanning (interlace format) in which interlaced scanning is performed every 1/60 second is often adopted so as to increase the dynamic resolution of a subject.

Under the above-described situation in which an appropriate scanning format is selected according to the purpose of image capturing, the case in which a single system records both a moving image and a still image will be considered.

Japanese Unexamined Patent Application Publication No. 2002-44531 discloses a technique that allows a user to simultaneously capture a still image and a moving image, as well as, achieve a high-resolution still image.

If a system giving priority to the quality of still images records a moving image without using the technique disclosed in Japanese Unexamined Patent Application Publication No. 2002-44531, the progressive scanning format suitable for capturing still images is adopted for an image pickup device included in the system. That is, a moving image is recorded using images obtained from the progressive scanning in which scanning is performed every 1/30 second or more, whereby a dynamic resolution is decreased.

In contrast, if a system giving priority to the quality of moving images records a still image, the interlace scanning format suitable for capturing moving images is adopted for an image pickup device included in the system. That is, IP conversion is performed upon a moving image portion obtained at the moment when a user gives a still image recording instruction by pressing a shutter button, whereby a single still image can be obtained. In this case, however, since basic image processing performed upon a signal output from the image pickup device such as color difference correction, gamma correction, etc. is not processing suitable for still images, but processing suitable for moving images, the obtained still image is often inferior in quality to a still image captured by a digital still camera.

In order to prevent the deterioration in the quality of still images, there is an apparatus capable of generating a moving image signal and a still image signal from a single output from an image pickup device using two paths, a path in which processing dedicated to moving images is performed, and a path in which processing dedicated to still images is performed. However, since such a single system includes two configurations in which similar processing is performed, a circuit size and power consumption are generally increased. In addition, this leads to a disadvantageous increase in cost.

In order to achieve both a moving image recording function and a still image recording function using a pair of an image pickup device and a single processing path, and, as well as, to obtain high-quality moving images and still images, entire operation switching such as switching between scanning formats for the image pickup device is required.

However, if the entire operation switching is performed, that is, operation switching from a scanning format suitable for moving images to a scanning format suitable for still images is performed when a still image recording instruction is given during moving image recording, no moving image signal can be supplied from the image pickup device during the still image recording. Accordingly, the moving image recording becomes chronologically discontinuous.

In order to prevent the above-described discontinuity, and to obtain a high-quality still image without reducing the quality of a moving image, as disclosed in Japanese Unexamined Patent Application Publication No. 2002-44531, the technique in which an imaging signal having a resolution higher than that of a moving image is output every N times ($N \geq 2$) of a moving image capturing cycle has been proposed. However, according to the technique, a high-resolution still image cannot be obtained in a remaining (N−1) frame period in which the high-resolution imaging signal is not output.

It is desirable to provide an image pickup apparatus, an image processing method, and a program capable of capturing high-quality moving images and still images without requiring separate configurations for processing moving images and still images.

SUMMARY OF THE INVENTION

An image pickup apparatus according to an embodiment of the present invention includes: an image capturing unit configured to capture an image; a first recording unit configured to temporarily record an original image signal output from the image capturing unit; a processing unit configured to perform predetermined signal processing upon the original image signal output from the image capturing unit; and an instructing unit configured to instruct the processing unit to capture a still image. When the processing unit is instructed to capture a still image by the instructing unit while performing moving image signal processing upon the original image signal output from the image capturing unit, the processing unit may cause the first recording unit to record the original image signal output from the image capturing unit. In addition, the processing unit may read out the recorded original image signal from the first recording unit and perform still image signal processing upon the read out original image signal while suspending the moving image signal processing.

The image pickup apparatus can further include a compressing/decompressing unit configured to perform predetermined compression processing upon the original image signal output from the image capturing unit and record the compressed original image signal in the first recording unit, and to perform predetermined decompression processing upon the compressed original image signal read out from the first recording unit and provide the decompressed original image signal for the processing unit.

When the processing unit is instructed to capture a still image by the instructing unit, the processing unit can record an image capturing condition of the image capturing unit at the time the still image capturing instruction is given along with the original image signal in the first recording unit. In addition, the processing unit can read out the original image signal and the image capturing condition from the first recording unit, and perform the still image signal processing upon the read out original image signal on the basis of the read out image capturing condition while suspending the moving image signal processing.

The image pickup apparatus can further include a second recording unit different from the first recording unit. In this case, when the processing unit is instructed to capture a still image by the instructing unit, the processing unit can record an image capturing condition of the image capturing unit at the time the still image capturing instruction is given in the second recording unit. In addition, the processing unit can read out the original image signal from the first recording unit, and the image capturing condition from the second recording unit, and perform the still image signal processing upon the original image signal read out from the first recording unit on the basis of the image capturing condition read out from the second recording unit while suspending the moving image signal processing.

The image pickup apparatus can further include a presenting unit configured to present to a user a still image generated by causing the processing unit to perform the still image signal processing upon the original image signal. In this case, the processing unit can perform still image signal processing different from the still image signal processing that has been performed upon the original image signal to generate the still image to be presented by the presenting unit upon the same original image signal output from the first recording unit in accordance with a user's instruction.

An image processing method according to an embodiment of the present invention is an image processing method of an image pickup apparatus that may include: an image capturing unit configured to capture an image; a recording unit configured to temporarily record an original image signal output from the image capturing unit; a processing unit configured to perform predetermined signal processing upon the original image signal output from the image capturing unit; and an instructing unit configured to instruct the processing unit to capture a still image. The image processing method includes: causing the recording unit to record the original image signal output from the image capturing unit when a still image capturing instruction is given by the instructing unit while moving image signal processing is being performed upon the original image signal output from the image capturing unit; and reading out the recorded original image signal from the recording unit and performing still image signal processing upon the read out original image signal while the moving image signal processing is suspended.

A program according to an embodiment of the present invention is a program for causing a computer to perform image processing of an image pickup apparatus that may include: an image capturing unit configured to capture an image; a recording unit configured to temporarily record an original image signal output from the image capturing unit; a processing unit configured to perform predetermined signal processing upon the original image signal output from the image capturing unit; and an instructing unit configured to instruct the processing unit to capture a still image. The program includes: causing the recording unit to record the original image signal output from the image capturing unit when a still image capturing instruction is given by the instructing unit while moving image signal processing is being performed upon the original image signal output from the image capturing unit; and reading out the recorded original image signal from the recording unit and performing still image signal processing upon the read out original image signal while the moving image signal processing is suspended.

According to an embodiment of the present invention, when still image recording is instructed while moving image signal processing is being performed upon an original image signal, the original image signal is recorded. In addition, when the moving image signal processing is suspended, the original image signal is read out and undergoes still image signal processing.

According to an embodiment of the present invention, high-quality moving images and still images can be captured without requiring separate configurations for processing moving images and still images.

BRIEF DESCRIPTION OF THE DRAWINGS

FIG. 15 is a block diagram showing an exemplary configuration of a personal computer.

DETAILED DESCRIPTION

Figure 1:
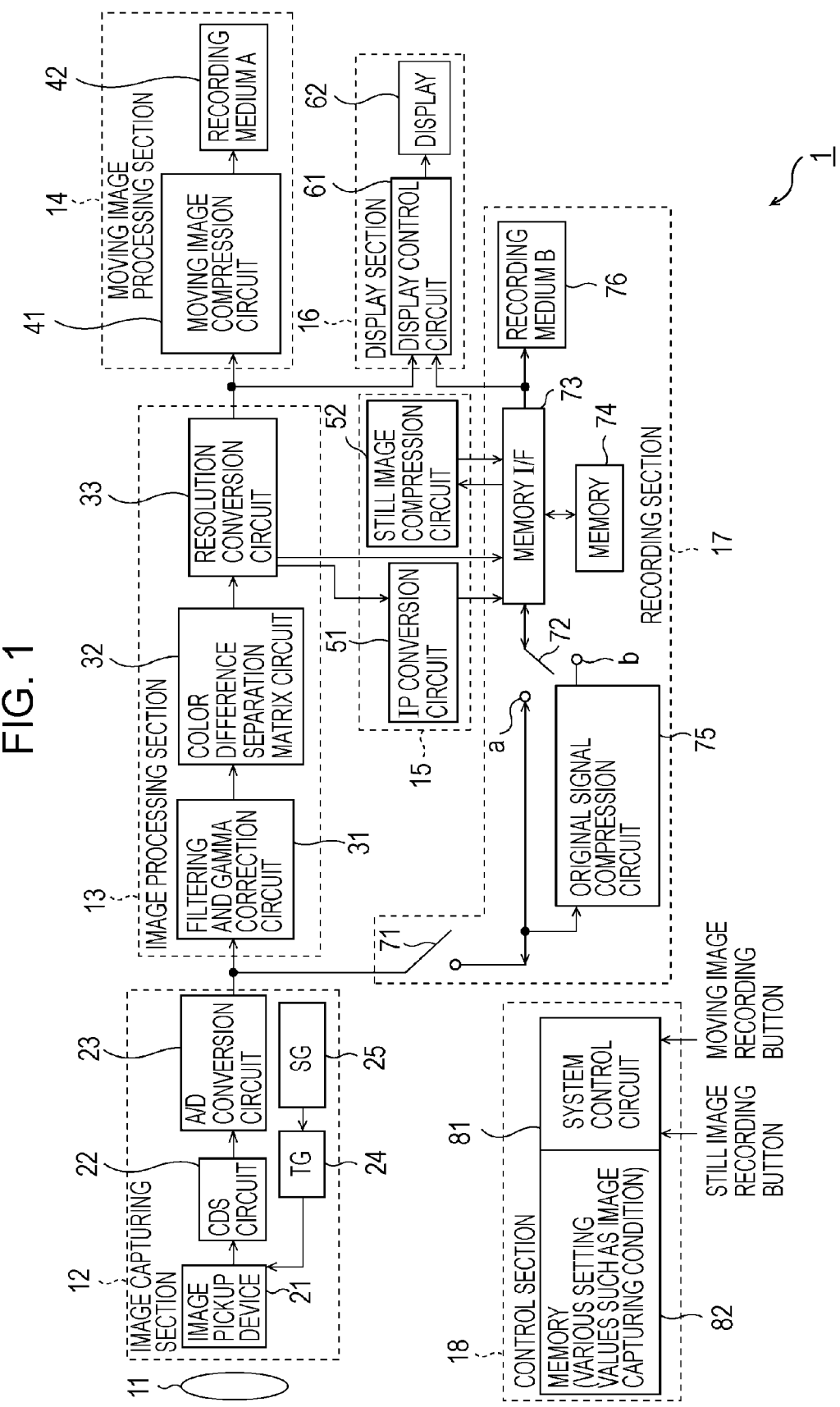
FIG. 1 is a block diagram showing an exemplary configuration of an image pickup apparatus according to an embodiment of the present invention.

Before describing an embodiment of the present invention, the correspondence between the features of the present invention and an embodiment described in this specification or the accompanying drawings is discussed below. This description is intended to assure that an embodiment supporting the claimed invention is described in this specification or the accompanying drawings. Thus, even if an embodiment in this specification or the accompanying drawings is not described as relating to a certain feature of the present invention, that does not necessarily mean that the embodiment does not relate to that feature of the claims. Conversely, even if an embodiment is described herein as relating to a certain feature of the claims, that does not necessarily mean that the embodiment does not relate to other features of the claims.

An image pickup apparatus according to an embodiment of the present invention (for example, an image pickup apparatus 1 shown in FIG. 1) includes: an image capturing unit (for example, an image capturing section 12 shown in FIG. 1) configured to capture an image; a first recording unit (for example, a memory 74 shown in FIG. 1) configured to temporarily record an original image signal output from the image capturing unit; a processing unit (for example, an image processing section 13 shown in FIG. 1) configured to perform predetermined signal processing (for example, moving image processing or still image processing) upon the original image signal output from the image capturing unit (for example, the original image signal directly output from the image capturing unit or the original image signal output from the image capturing unit and temporarily recorded); and an instructing unit (for example, a control section 18 shown in FIG. 1) configured to instruct the processing unit to capture a still image. When the processing unit is instructed to capture a still image by the instructing unit while performing moving image signal processing upon the original image signal output from the image capturing unit, the processing unit causes the first recording unit to record the original image signal output from the image capturing unit. In addition, the processing unit reads out the recorded original image signal from the first recording unit and performs still image signal processing upon the read out original image signal while suspending the moving image signal processing.

The image pickup apparatus can further include a compressing/decompressing unit (for example, an original signal compression circuit 75 shown in FIG. 1) configured to perform predetermined compression processing upon the original image signal output from the image capturing unit and record the compressed original image signal in the first recording unit, and to perform predetermined decompression processing upon the compressed original image signal read out from the first recording unit and provide the decompressed original image signal for the processing unit.

The image pickup apparatus can further include a second recording unit (for example, a memory 82 shown in FIG. 1) different from the first recording unit. In this case, when the processing unit is instructed to capture a still image by the instructing unit, the processing unit can record an image capturing condition of the image capturing unit at the time the still image capturing instruction is given in the second recording unit. In addition, the processing unit can read out the original image signal from the first recording unit, and the image capturing condition from the second recording unit, and perform the still image signal processing upon the original image signal read out from the first recording unit on the basis of the image capturing condition read out from the second recording unit while suspending the moving image signal processing.

The image pickup apparatus can further include a presenting unit (for example, a display control circuit 61 shown in FIG. 1) configured to present to a user a still image generated by causing the processing unit to perform the still image signal processing upon the original image signal. In this case, the processing unit can perform still image signal processing different from the still image signal processing that has been performed upon the original image signal to generate the still image to be presented by the presenting unit upon the same original image signal output from the first recording unit in accordance with a user's instruction.

An image processing method or a program according to an embodiment of the present invention is an image processing method or a program of an image pickup apparatus (for example, the image pickup apparatus 1 shown in FIG. 1) that includes: an image capturing unit (for example, the image capturing section 12 shown in FIG. 1) configured to capture an image; a recording unit (for example, the memory 74 shown in FIG. 1) configured to temporarily record an original image signal output from the image capturing unit; a processing unit (for example, the image processing section 13 shown in FIG. 1) configured to perform predetermined signal processing (for example, moving image processing or still image processing) upon the original image signal output from the image capturing unit (for example, the original image signal directly output from the image capturing unit or the original image signal output from the image capturing unit and temporarily recorded); and an instructing unit (for example, the control section 18 shown in FIG. 1) configured to instruct the processing unit to capture a still image. The image processing method or program includes the steps of: causing the recording unit to record the original image signal output from the image capturing unit when a still image capturing instruction is given by the instructing unit while moving image signal processing is being performed upon the original image signal output from the image capturing unit; and reading out the recorded original image signal from the recording unit and performing still image signal processing upon the read out original image signal while the moving image signal processing is suspended (for example, step S45 shown in FIG. 11).

An embodiment of the present invention will be described with reference to the accompanying drawings.

FIG. 1 is a block diagram showing an exemplary configuration of the image pickup apparatus 1 according to an embodiment of the present invention.

The image pickup apparatus 1 is provided with a lens section 11, the image capturing section 12, the image processing section 13, a moving image processing section 14, a still image processing section 15, a display section 16, a recording section 17, and the control section 18, and captures moving images and still images using the above-described configuration. That is, the image pickup apparatus 1 does not have separate two circuit configurations (image processing sections), a circuit configuration suitable for recording moving images, and a circuit configuration suitable for recording still images, and performs signal processing for recording moving images and still images using a single configuration of the image processing section 13.

For example, if a still image recording instruction is given during moving image recording, a signal obtained by the image capturing section 12 at the timing of the instruction is divided into two signals. One signal undergoes moving image processing and is then recorded, and the other signal undergoes compression processing as appropriate as described later and is then temporarily recorded in a memory such as a RAM (Random Access Memory).

After that, when the moving image recording is suspended, the signal temporarily recorded in the RAM is transmitted to the image processing section 13 and undergoes still image processing and is then recorded as a single still image. In the image processing section 13, a parameter specifying details of moving image processing and a parameter specifying details of still image processing are switched in accordance with image processing to be performed.

As described above, if a still image recording instruction is given during moving image recording, a signal obtained by the moving image recording at the moment of the instruction is saved so as to use the obtained signal for the still image recording later. While the moving image recording is stopped, still image processing is performed upon the saved signal. Thus, moving image processing and still image processing can be performed using a single configuration (the image processing section 13, therefore, the circuit size and power consumption of the image pickup apparatus 1 can be smaller than those of an apparatus having two configurations, a configuration for performing moving image processing, and a configuration for performing still image processing. In addition, cost reduction can be achieved.

By making the timing of the moving image processing for recording a moving image different from that of the still image processing for recording a still image, the moving image processing and the still image processing can be performed upon a signal to be used for recording a moving image and a signal to be used for recording a still image (a signal that has been temporarily saved), respectively. Consequently, a high-quality still image can be obtained without loss of moving image quality.

The processing flow of the image pickup apparatus 1 will be described later with reference to a flowchart.

The lens section 11 is provided with optical modules such as a lens for focusing light from a subject, a focus lens for adjusting the focus of the lens, and an aperture. Light from a subject is focused by the lens included in the lens section 11 and is made incident upon an image pickup device 21 included in the image capturing section 12.

The image capturing section 12 is provided with the image pickup device 21, a CDS (Correlated Double Sampling) circuit 22, an A/D (Analog/Digital) conversion circuit 23, a timing generator (TG) 24, and a signal generator (SG) 25.

The image pickup device 21 receives light incident from the lens section 11, photoelectrically converts the light into an electric signal in accordance with the amount of light received, and then outputs the electric signal to the CDS circuit 22 as an analog image signal by performing the progressive scanning or by performing the interlaced scanning (scanning that is performed in accordance with an moving image capturing cycle) every 1/60 second in accordance with a timing signal transmitted from the timing generator 24. The image pickup device 21 is configured with a CCD (Charge Coupled Device) or CMOS (Complementary Metal Oxide Semiconductor) having a resolution higher than a general moving image resolution of, for example, 2304 horizontal pixels by 1728 vertical pixels (a resolution higher than that of the SD (Standard Definition) or HD (High Definition) format).

The CDS circuit 22 removes a noise component from the signal transmitted from the image pickup device 21 by performing correlated double sampling upon the signal, and outputs an obtained signal to the A/D conversion circuit 23.

The A/D conversion circuit 23 performs A/D conversion upon the analog image signal transmitted from the CDS circuit to obtain a digital signal, and outputs the obtained digital signal to a subsequent stage. The signal output from the A/D conversion circuit 23 is a signal upon which appropriate processing will be performed later according to its intended use, for example, use for moving image recording or still image recording, that is, is a RAW signal before retouching is performed thereupon. Accordingly, the signal output from the A/D conversion circuit 23 is hereinafter referred to as an original signal (original image signal).

The original signal output from the A/D conversion circuit 23 is transmitted to a filtering and gamma correction circuit 31 included in the image processing section 13. When a switch 71 included in the recording section 17 is connected, the original signal output from the A/D conversion circuit 23 is also transmitted to the recording section 17. As described later, the switch 71 is to be connected under the control of the control section 18 when a user gives a still image recording instruction.

The timing generator 24 generates a horizontal drive signal and a vertical drive signal on the basis of a horizontal reset signal and a vertical reset signal transmitted from the signal generator 25, respectively, and outputs these generated signals to the image pickup device 21. A signal of each pixel is read out from the image pickup device 21 in accordance with the horizontal drive signal and the vertical drive signal.

The signal generator 25 generates the horizontal reset signal and the vertical reset signal, and outputs these generated signals to the timing generator 24.

The image processing section 13 is provided with the filtering and gamma correction circuit 31, a color difference separation matrix circuit 32, and a resolution conversion circuit 33.

The filtering and gamma correction circuit 31 performs noise reduction processing, white balance control processing, and gamma correction processing upon the signal transmitted from the A/D conversion circuit 23 in accordance with parameters set by the control section 18, and outputs an obtained signal to the color difference separation matrix circuit 32.

The color difference separation matrix circuit 32 performs color difference separation matrix processing upon the signal transmitted from the filtering and gamma correction circuit 31 in accordance with a parameter set by the control section 18 to generate a luminance signal and a color-difference signal in accordance with its intended use, and outputs these generated signals to the resolution conversion circuit 33.

The resolution conversion circuit 33 generates an image of a predetermined size on the basis of the signals transmitted from the color difference separation matrix circuit 32 in accordance with a parameter (resolution) set by the control section 18, and outputs signals corresponding to the generated image to a moving image compression circuit 41 included in the moving image processing section 14, an IP conversion circuit 51 included in the still image processing section 15, the display control circuit 61 included in the display section 16, and a memory I/F 73 included in the recording section 17.

For example, when a moving image is recorded, the resolution conversion circuit 33 sets a low resolution to generate image signals of a size compliant with the DV (Digital Video) standard on the basis of the signals transmitted from the color difference separation matrix circuit 32, and outputs the generated signals to the moving image compression circuit 41. In the case of moving image recording, the signals output from the resolution conversion circuit 33 are also transmitted to the display control circuit 61 included in the display section 16, and are used to display a captured image.

If the signals transmitted from the color difference separation matrix circuit 32 are signals separated from original signals that have been temporarily saved in the memory 74, and if the original signals are signals compliant with the interlace format (if a scanning format adopted for the image pickup device 21 is the interlace format), the signals are required to be converted into a signal compliant with the progressive format so that a single still image can be recorded. Accordingly, the resolution conversion circuit 33 outputs the generated image signals of a predetermined size to the IP conversion circuit 51. In contrast, if the signals transmitted from the color difference separation matrix circuit 32 are signals separated from an original signal compliant with the progressive format (if a scanning format adopted for the image pickup device 21 is the progressive format), the resolution conversion circuit 33 outputs the generated image signals of a predetermined size to the memory I/F 73.

Parameters set for the filtering and gamma correction circuit 31, the color difference separation matrix circuit 32, and the resolution conversion circuit 33 by the control section 18 when moving image processing is performed upon the original signal directly transmitted from the image capturing section 12 are different from those set for these circuits by the control section 18 when still image processing is performed upon the original signal that has been temporarily saved in the memory 74 and then has been read out from the memory 74 and transmitted to the image processing section 13. Different types of processing are performed in these circuits according to the parameters that have been set. That is, when the original signal transmitted from the image capturing section 12 is to be processed, moving image parameters are set for these circuits, and when the original signal that has been temporarily saved in the memory 74 is to be processed, still image parameters are set for these circuits.

The image processing section 13 is provided with not only the circuits shown in FIG. 1 but also various types of signal processing circuits (not shown) such as an effect applying circuit, a sharpness control circuit, a detected value detection circuit, and an extraction area control circuit for controlling an extraction area used for camera-shake correction.

The moving image processing section 14 is provided with the moving image compression circuit 41, and a recording medium 42 (hereinafter referred to as a recording medium A as appropriate).

The moving image compression circuit 41 performs moving image coding processing compliant with the DV or MPEG (Moving Picture Experts Group) standard upon the signals transmitted from the resolution conversion circuit 33 to obtain moving image coded data, and records the obtained moving image coded data on the recording medium A.

The recording medium A is a recording medium removably connected to the image pickup apparatus 1 such as a tape or DVD (Digital Versatile Disc), or a fixed recording medium incorporated into the image pickup apparatus 1 such as a hard disk. The moving image coded data transmitted from the moving image compression circuit 41 is recorded on the recording medium A. The moving image coded data is read out from the recording medium A by the moving image compression circuit 41 and is then reproduced on the image pickup apparatus 1 or transmitted to an external apparatus such as a personal computer.

The still image processing section 15 is provided with the IP conversion circuit 51, and a still image compression circuit 52.

The IP conversion circuit 51 converts the signals compliant with the interlace format which have been transmitted from the resolution conversion circuit 33 into a signal compliant with the progressive format, and outputs the signal compliant with the progressive format to the memory I/F 73. As described previously, when a scanning format adopted for the image pickup device 21 is the interlace format and still image recording is performed, the signals compliant with the interlace format are to be transmitted from the resolution conversion circuit 33 to the IP conversion circuit 51.

Figure 2:
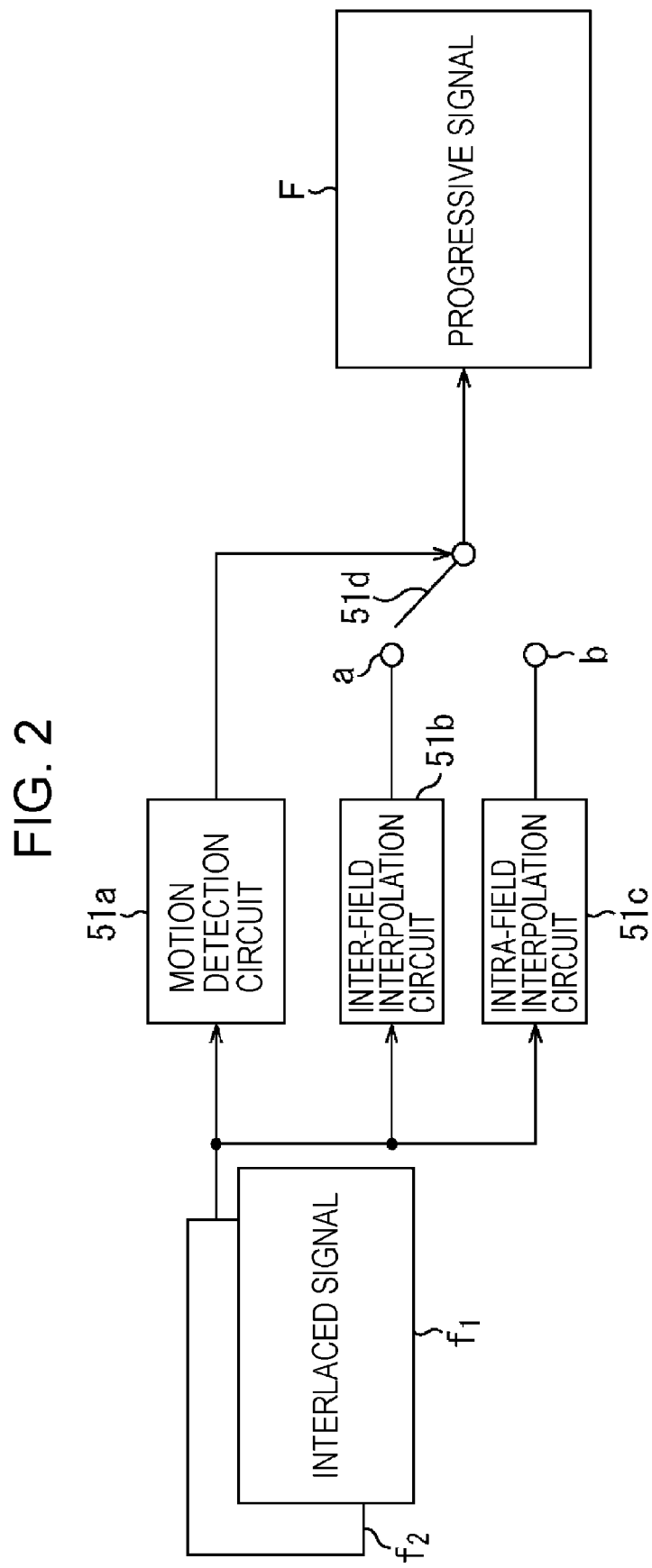
FIG. 2 is a block diagram showing an exemplary detailed configuration of an IP conversion circuit shown in FIG. 1.

FIG. 2 is a diagram showing an exemplary detailed configuration of the IP conversion circuit 51.

When interlaced signals $f_1$ and $f_2$ of images composed of two fields which have been obtained from the image pickup device 21 configured to perform interlaced scanning and have been temporarily saved in the memory 74 are transmitted from the resolution conversion circuit 33 to a motion detection circuit 51a, the motion detection circuit 51a detects appearance of motion in the images, and switches the connection of a switch 51d in accordance with the result of the detection.

Figure 3:
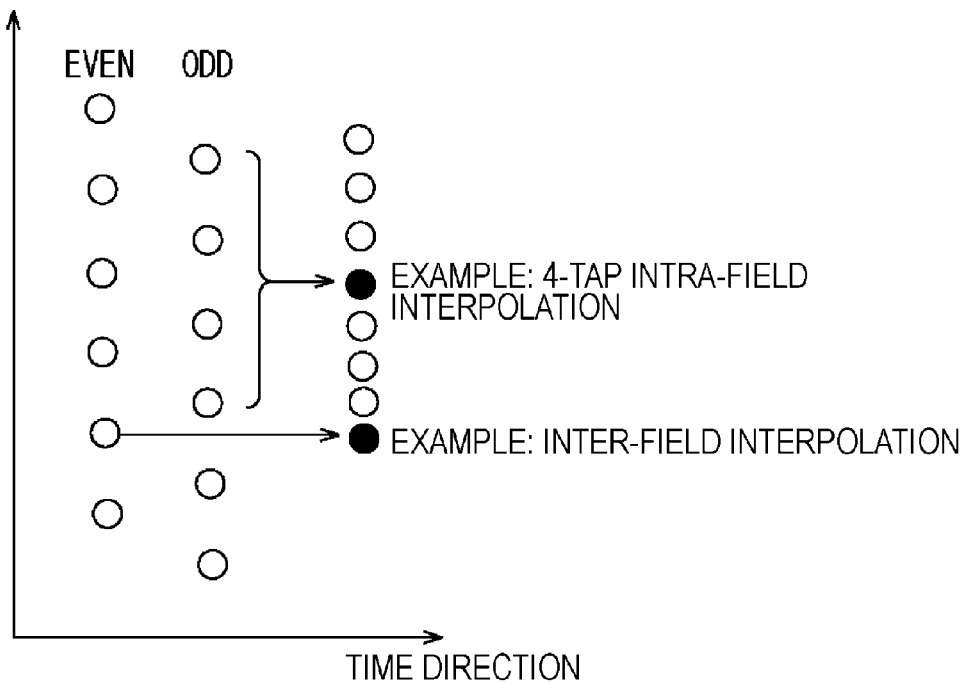
FIG. 3 is a diagram showing an exemplary IP conversion.

For example, the motion detection circuit 51a detects motion using a block matching method or the like, and, as shown in FIG. 3, connects the switch 51d to a terminal b in a moving area so that a pixel included in a skipped line can be interpolated using the result of intra-field interpolation, and connects the switch 51d to a terminal a in a still area so that interpolation can be performed using a signal included in a precedent field. This processing is repeated on a line-by-line basis. When pixels included in all lines are generated, a progressive signal F is output from the IP conversion circuit 51 to the memory I/F 73, and is compressed by the still image compression circuit 52, and is then recorded on a recording medium 76 (hereinafter referred to as a recording medium B as appropriate) as a single still image.

If only an original signal of one field which is obtained by interlaced scanning is supplied for use in still image recording, all pixels may be interpolated using intra-field interpolation to generate a single still image (the progressive signal F).

An inter-field interpolation circuit 51b performs inter-field interpolation using the obtained image signals of two fields, and outputs the result of the inter-field interpolation.

An intra-field interpolation circuit 51c performs intra-field interpolation using the obtained image signals, an outputs the result of the intra-field interpolation.

Referring back to FIG. 1, the still image compression circuit 52 performs compression processing upon the signals (luminance and color-difference signals) transmitted from the resolution conversion circuit 33 via the memory I/F 73 or upon the signal transmitted from the IP conversion circuit 51 via the memory I/F 73 in accordance with, for example, the JPEG (Joint Photographic Expert Group) format to obtain still image coded data, and records the obtained still image coded data in the memory 74 via the memory I/F 73. The still image coded data generated from the original signal or original signals is temporarily recorded in, for example, the memory 74, and is transmitted to the recording medium 76, and is then recorded thereon.

The display section 16 is provided with the display control circuit 61 and a display 62.

The display control circuit 61 displays an image captured by the image pickup device 21 on the display 62 on the basis of the signals output from the resolution conversion circuit 33 when moving image recording is performed, and displays a moving image recorded on the recording medium A on the display 62 on the basis of a signal transmitted from the moving image compression circuit 41 when the moving image recorded on the recording medium A is reproduced.

When the still image that has been generated on the basis of the original signal or original signals and has been recorded in the memory 74 or on the recording medium B is reproduced, the display control circuit 61 causes the still image to be displayed in accordance with the resolution of the display 62 on the basis of the signal that has been decompressed by the still image compression circuit 52 and has been transmitted via the memory I/F 73.

If the image pickup apparatus 1 has an IEEE (Institute of Electrical and Electronics Engineers) 1394 output function and a component output function, the display control circuit 61 causes a moving image and a still image to be displayed on an external display using these functions.

The display 62 is configured with an LCD (Liquid Crystal Display), and displays a moving image or a still image on the basis of a signal transmitted from the display control circuit 61.

The recording section 17 is provided with the switch 71, a switch 72, the memory I/F 73, the memory 74, the original signal compression circuit 75, and the recording medium 76.

The switch 71 is connected under the control of the control section 18 to pass a currently transmitted original signal to the recording section 17.

When a user gives a still image recording instruction during moving image recording, the switch 71 is connected by the control section 18. At that time, the original signal divided between the image capturing section 12 and the image processing section 13 is transmitted to the original signal compression circuit 75 and the switch 72 that functions as a path to the memory 74. In addition, when the original signal has been temporarily recorded in the memory 74 and moving image processing is suspended, the switch 71 is also connected by the control section 18, whereby the original signal temporarily recorded in the memory 74 is transmitted to the leading unit of the image processing section 13 via the switch 71.

The switch 72 is connected to either a terminal a or b under the control of the control section 18, and passes a currently transmitted original signal.

The memory I/F 73 is an interface for the memory 74, and writes data in the memory 74 or reads out data from the memory 74.

Figure 4:
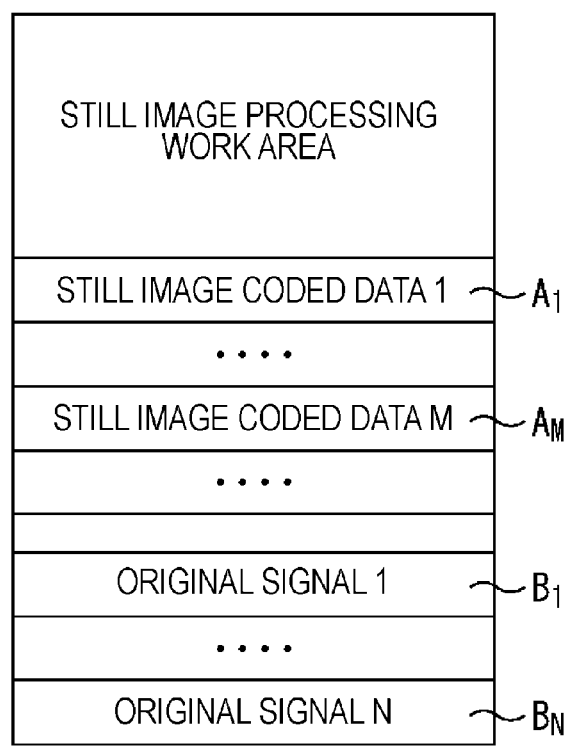
FIG. 4 is a diagram showing exemplary areas formed in a memory shown in FIG. 1.

FIG. 4 is a diagram showing exemplary areas formed in the memory 74.

As shown in FIG. 4, a still image processing work area, areas $A_1$ through $A_M$, areas $B_1$ through $B_N$ are formed in the memory 74.

The still image processing work area is an area that allows the IP conversion circuit 51 to perform IP conversion, and the still image compression circuit 52 to perform compression processing and decompression processing.

The areas $A_1$ through $A_M$ are areas in which still image coded data generated on the basis of an original signal is temporarily recorded. For example, still image coded data generated on the basis of an original signal recorded in one of the areas $B_1$ through $B_N$ is recorded in one of the areas $A_1$ through $A_M$.

The areas $B_1$ through $B_N$ are areas in each of which an original signal is recorded. That is, when still image recording is instructed during moving image recording, an original signal obtained at the moment of the instruction is saved in one of the areas $B_1$ through $B_N$. When the moving image recording is suspended, the original signal recorded in one of the areas $B_1$ through $B_N$ is read out and is then used to generate a still image.

A plurality of areas for recording an original signal therein are formed in the memory 74. An original signal obtained at the moment of the first still image recording instruction is recorded in the area $B_1$, and an original signal obtained at the moment of the Nth still image recording instruction is recorded in the area $B_N$. That is, each time the still image recording instruction is given, an original signal is recorded in one of the areas. Accordingly, a user can record a plurality of still images during recording of a single moving image until the memory 74 reaches a predetermined capacity.

If a scanning format adopted for the image pickup device 21 is the interlace format, original signals (ODD/EVEN) of two fields are required to generate a single still image using IP conversion. In this case, for example, the original signals of two fields are individually recorded in consecutive areas.

Referring back to FIG. 1, the original signal compression circuit 75 compresses the original signal that has been transmitted via the switch 71 under the control of the control section 18, and outputs the compressed original signal to the memory I/F 73 via the switch 72. If the compressed original signal has been recorded in the memory 74, the original signal compression circuit 75 decompresses the compressed original signal that has been read out from the memory 74 by the memory I/F 73 and has been transmitted via the switch 72, and then outputs the decompressed original signal to the image processing section 13 via the switch 71.

Thus, the original signal output from the image capturing section 12 is compressed as appropriate. The original signal compressed by the original signal compression circuit 75 is selected by the switch 72, and is then recorded in the memory 74 as a signal to be used for still image recording, whereby the capacity of the memory 74 can be effectively used.

Here, the original signal compressed or decompressed by the original signal compression circuit 75 is also a signal upon which appropriate processing will be performed later for its intended use, for example, use for moving image recording or still image recording, that is, is a signal upon which moving image retouching (image processing performed by the image processing section 13) or still image retouching has not yet been performed. Accordingly, the original signal compressed or decompressed by the original signal compression circuit 75 can be also referred to as an "original signal" like the original signal that has been saved in the memory 74 without being compressed.

The recording medium B is configured with a flash memory or the like removably connected to the image pickup apparatus 1, and records the still image coded data generated on the basis of the original signal.

The control section 18 is provided with a system control circuit 81 and the memory 82, and is connected to other sections shown in FIG. 1 via a signal line (not shown).

The system control circuit 81 is configured with a micro controller or the like, and controls the operation of the whole system in accordance with a user's button input received via an external interface (not shown) connected to the control section 18. The external interface is configured to alternately receive a moving image recording start instruction and a moving image recording end instruction each time a moving image recording button is pressed, and to receive a still image recording instruction each time a still image recording button is pressed. In addition, the external interface is configured to receive various instructions such as an image quality setting instruction and an effect setting instruction which have been input by a user using various buttons, and to receive an input from a gyro sensor (not shown). The system control circuit 81 detects the amount of camera-shake in accordance with the input from the gyro sensor during image capturing.

The memory 82 records various pieces of data such as an image capturing condition which are required for the system control circuit 81 to control each section.

Here, the operation of the system control circuit 81 will be described with reference to FIG. 5. The direction parallel to the plane of the drawing sheet of FIG. 5 represents a time direction.

For example, when a user presses a moving image recording button at a time $t_1$ to give the moving image recording start instruction, the system control circuit 81 causes the image capturing section 12 to start moving image recording, and sets moving image parameters for individual units included in the image processing section 13 to cause the units to process an original signal output from the image capturing section 12. Subsequently, the system control circuit 81 causes the moving image processing section 14 to code the processing result of the image processing section 13 and record moving image coded data obtained from the coding processing on the recording medium A.

Figure 5:
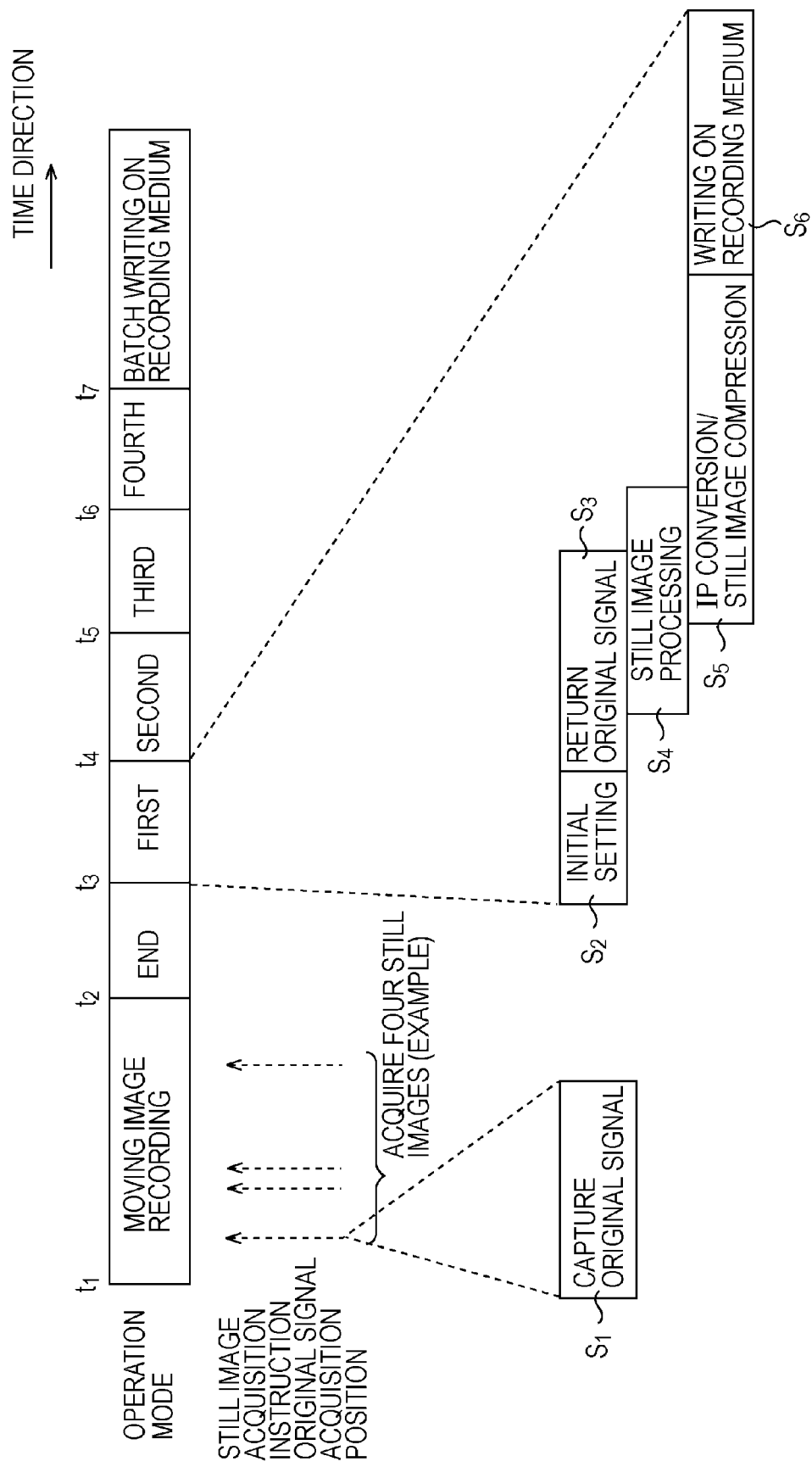
FIG. 5 is a diagram showing an exemplary operation of a system control circuit.

When the user presses a still image recording button at times represented by dotted arrows to give a still image recording instruction while the moving image recording on the recording medium A is being performed, the system control circuit 81 causes the image pickup apparatus 1 to continue the moving image recording, and causes the recording section 17 to perform compression processing as appropriate upon an original signal output from the image capturing section 12 to capture the original signal (to temporarily save the original signal in the memory 74) as indicated as a state $S_1$ in FIG. 5.

At that time, the system control circuit 81 causes the memory 82 included in the control section 18 to store the image capturing conditions of the moving image recording currently being performed such as an aperture value and a zoom position.

Each time the still image recording instruction is given, the original signal capturing and the image capturing condition storage are performed. In an example shown in FIG. 5, the user instructs the image pickup apparatus 1 to record four still images.

When the user presses the moving image recording button to give the moving image recording end instruction at a time $t_2$, the system control circuit 81 stops the moving image recording and starts the recording of the first still image at a time $t_3$. That is, the system control circuit 81 configures initial settings for still image processing as indicated as a state $S_2$.

For example, as the initial settings, the system control circuit 81 sets still image parameters that have been decided on the basis of the image capturing conditions stored in the memory 82 for individual units included in the image processing section 13 so that still image processing can be performed, and changes the setting of the level of edge enhancement which is required to be changed according to the type of image processing to be performed, that is, moving or still image processing. In addition, if decompression processing and IP conversion processing are required to be performed upon the original signal, the system control circuit 81 configures settings so that the processing can be performed.

When the initial settings have ended, the system control circuit 81 causes the switch 71 to be connected and to transmit the original signal that has been temporarily saved in the memory 74 to the leading unit of the image processing section 13 as indicated as a state $S_3$, and sequentially causes individual units included in the image processing section 13 to perform still image processing upon the original signal as indicated as a state $S_4$. A still image signal obtained from the still image processing performed by the image processing section 13 is stored in the still image processing work area formed in the memory 74 via the still image processing section 15.

If original signals compliant with the interlace format are output from the image capturing section 12 and are then temporarily saved in the memory 74, the original signals of two fields which are used to generate a single still image are sequentially processed by the image processing section 13, and are then stored in the still image processing work area formed in the memory 74.

The system control circuit 81 causes the still image processing section 15 to perform IP conversion and still image compression upon the signal or signals stored in the still image processing work area included in the memory 74 as appropriate as indicated as a state $S_5$. Data generated by the still image processing section 15 is stored in the memory 74 as still image coded data. Thus, processing for generating a single still image is sequentially and effectively performed like pipeline processing.

If each time a single still image is generated the generated single still image is recorded on the recording medium B, the system control circuit 81 transfers the still image coded data stored in the memory 74 to the recording medium B, and causes the recording medium B to record the transferred still image coded data. If all still images, each of which has been generated on the basis of an original signal or original signals, are recorded on the recording medium B at the same time, the system control circuit 81 transfers still image code data corresponding to all the still images from the memory 74 to the recording medium B after the still image coded data corresponding to all the still images has been stored in the memory 74.

When the still image processing for the first still image has been completed, the system control circuit 81 starts the same still image processing for the second still image at a time $t_4$. When the still image processing for the second still image has been completed, the system control circuit 81 starts the same still image processing for the third still image at a time $t_5$. When the still image processing for the third still image has been completed, the system control circuit 81 starts the same still image processing for the fourth still image at a time $t_6$.

When the still image processing for the fourth still image has been completed, that is, all the still images have been processed, the system control circuit 81 transfers the four still images stored in the memory 74 to the recording medium B, and causes the recording medium B to simultaneously record the four still images.

For example, when all the generated still images have been recorded on the recording medium B, the system control circuit 81 deletes the original signals recorded in the memory 74 to allow the memory 74 to record a new original signal.

The control section 18 performs the above-described control processing upon each section of the image pickup apparatus 1.

Figure 6:
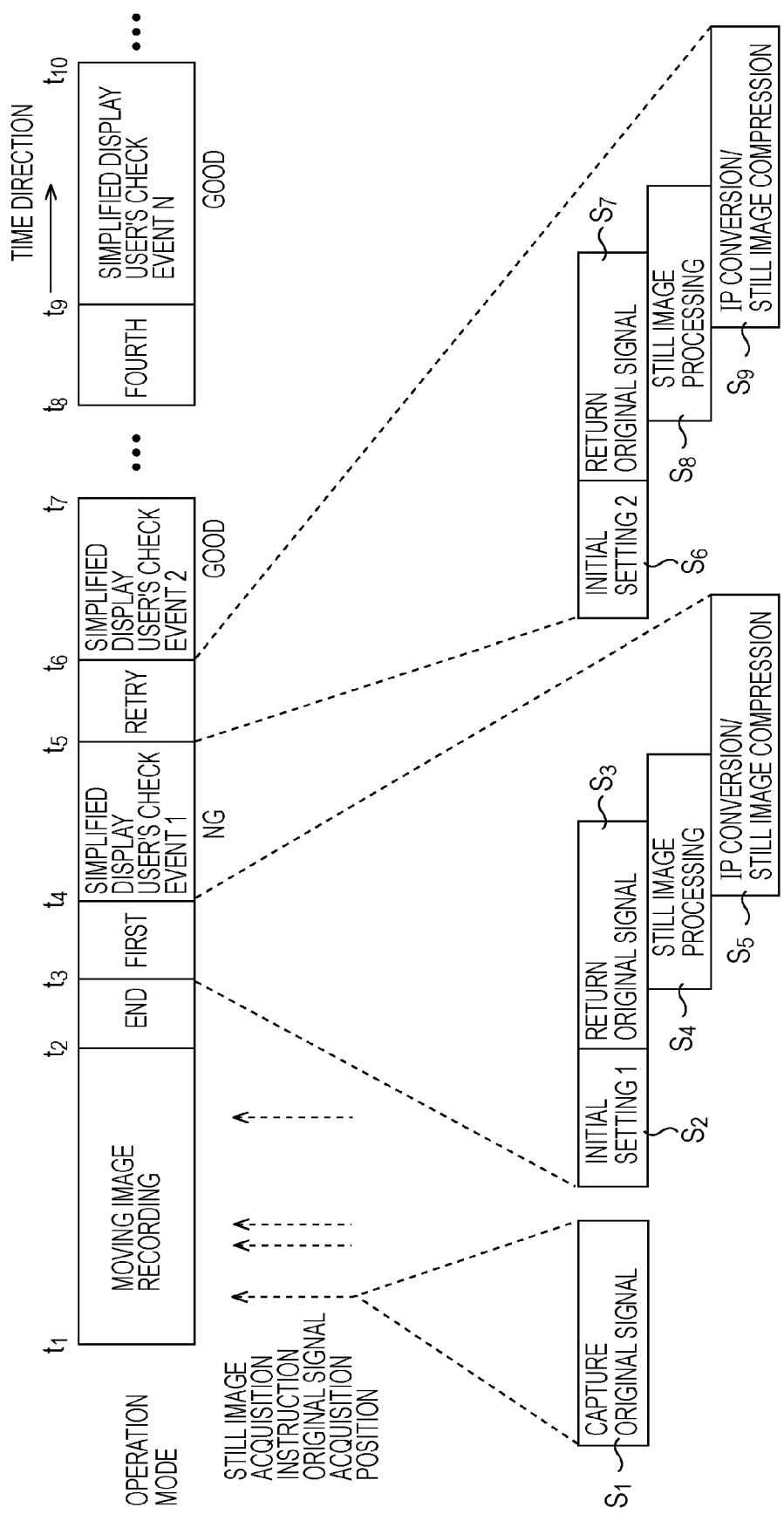
FIG. 6 is a diagram showing another exemplary operation of the system control circuit.

FIG. 6 is a diagram showing another exemplary operation of the system control circuit 81.

Referring to FIG. 6, each time a single still image is generated, the generated single still image is presented to a user so as to allow the user to check the quality of the still image. If the user is no satisfied with the quality of the generated still image, the user can change parameter settings, and cause the image pickup apparatus 1 to regenerate a single still image on the basis of the same original signal.

In FIG. 6, processing performed between a time $t_1$ to a time $t_4$ is the same as that described with reference to FIG. 5. That is, moving image recording is started in accordance with a user's operation. If still image recording is instructed during the moving image recording, original signal capturing is performed each time the still image recording instruction is given by the user. When the user gives the moving image recording end instruction to suspend the moving image processing, still images are generated on the basis of original signals that have been temporarily saved. Still image coded data corresponding to the generated still images is stored in the memory 74.

At the time $t_4$ when the first still image has been generated, the system control circuit 81 causes the display section 16 to display the generated first still image on the display 62 on the basis of the still image coded data stored in the memory 74 to allow the user to check the generated first still image. At that time, on a display screen displayed on the display 62, the user can select from among a storage mode (GOOD) of storing the generated still image and a retry mode (NG) of changing parameters and regenerating a still image.

As shown in FIG. 6, for example, if the retry mode is selected so as to regenerate the first still image by changing the parameters, the system control circuit 81 reconfigures the initial setting (initial setting 2) for still image processing at a time $t_5$ as indicated as a state $S_6$.

At that time, parameters different from those configured in the initial setting (initial setting 1) at the time $t_3$ are set for individual units included in the image processing section 13. The various parameters (parameters for setting the level of noise reduction, performing skin tone correction, and adding title characters) may be selected by the user.

When the initial setting 2 has been completed, the system control circuit 81 transmits the original signal that has been temporarily saved in the memory 74 to the leading unit of the image processing section 13, and sequentially causes individual units included in the image processing section 13 to perform still image processing upon the original signal as indicated as a state $S_8$.

When the regeneration of the first still image has been completed at a time $t_6$, the system control circuit 81 causes the display section 16 to display the regenerated still image on the display 62 on the basis of the still image coded data stored in the memory 74 to allow the user to check the regenerated still image.

As shown in FIG. 6, when the user has selected on a display screen displayed on the display 62 the storage mode (GOOD) of storing the regenerated still image, the system control circuit 81 starts still image processing for the second still image. The above-described processing will be repeated until the user instructs the image pickup apparatus 1 to store the fourth still image.

The original signal is deleted from the memory 74 after the still image generated on the basis of the original signal has been stored on the recording medium B. Accordingly, the user can repeatedly cause the image pickup apparatus 1 to generate still images of different qualities on the basis of the same original signal by controlling the parameters until the user instructs the image pickup apparatus 1 to store one of the still images generated on the basis of the same original signal on the recording medium B.

The still image generated on the basis of the original signal that has been temporarily saved in the memory 74 is stored on the recording medium B. Accordingly, after the user has captured an image (after the user has pressed a shutter button), the user can retouch the captured image to suit the user's taste. In addition, the user can record only a still image of favorite quality on the recording medium B.

The image pickup apparatus 1 can generate still images of different qualities on the basis of original signals by changing parameters as appropriate, thereby preventing the standardization of the generated still images in quality.

Next, the operation of the image pickup apparatus 1 will be described with reference to flowcharts.

First, the entire process (main process) of the image pickup apparatus 1 will be described with reference to the flowchart shown in FIG. 7. This process starts when the power of the image pickup apparatus 1 is turned on.

In step S1, the system control circuit 81 determines whether a user has given a moving image recording start instruction. If it is determined that the user has not given the moving image recording start instruction, the system control circuit 81 waits for the instruction.

If it is determined that the user has pressed a moving image recording button to give the moving image recording start instruction in step S1, the process proceeds to step S2. In step S2, the system control circuit 81 performs moving image processing upon an original signal output from the image capturing section 12 to acquire moving image coded data. The details of the moving image processing will be described later with reference to the flowchart shown in FIG. 8.

In step S3, the moving image compression circuit 41 included in the moving image processing section 14 records the moving image coded data acquired by the moving image processing on the recording medium A.

In step S4, the system control circuit 81 determines whether the user has given a still image recording instruction. If it is determined that the user has pressed a still image recording button to give the still image recording instruction, the process proceeds to step S5. In step S5, the system control circuit 81 performs original signal storage processing to temporarily record an original signal output from the image capturing section 12 in the memory 74. The details of the original signal storage processing will be described later with reference to the flowchart shown in FIG. 9.

On the other hand, if it is determined that the user has not given the still image recording instruction in step S4, step S5 is skipped.

In step S6, the system control circuit 81 determines whether the user has given a moving image recording end instruction. If it is determined that the user has not given the moving image recording end instruction, the process returns to step S2, and then the subsequent process is repeated.

If it is determined that the user has pressed the moving image recording button to give the moving image recording end instruction in step S6, the process proceeds to step S7. In step S7, the system control circuit 81 ends the moving image recording.

In step S8, the system control circuit 81 determines whether it should perform still image recording. If the still image recording instruction has not been given during the moving image recording, the system control circuit 81 determines that it should not perform still image recording. Subsequently, the process proceeds to step S1, and then the subsequent process is repeated.

On the other hand, if the still image recording instruction has been given during the moving image recording, and if the original signal has been recorded in the memory 74, the system control circuit 81 determines that it should perform still image recording in step S8. Subsequently, the process proceeds to step S9. In step S9, the system control circuit 81 performs still image recording processing to generate a still image on the basis of the original signal and record the generated still image on the recording medium B. The details of the still image recording processing will be described later with reference to the flowchart shown in FIG. 11.

When the still image recording processing has been completed, the process returns to step S1, and then the subsequent process is performed.

Next, the moving image processing performed in step S2 of FIG. 7 will be described with reference to the flowchart shown in FIG. 8.

In step S11, the system control circuit 81 sets moving image parameters for individual units included in the image processing section 13. In step S12, the system control circuit 81 causes the individual units included in the image processing section 13 to perform the moving image processing upon the original signal output from the image capturing section 12.

In step S13, the system control circuit 81 causes the moving image processing section 14 to code the processing result of the image processing section 13. Subsequently, the process returns to step S2 of FIG. 7, and then the subsequent process is performed.

Figure 9:
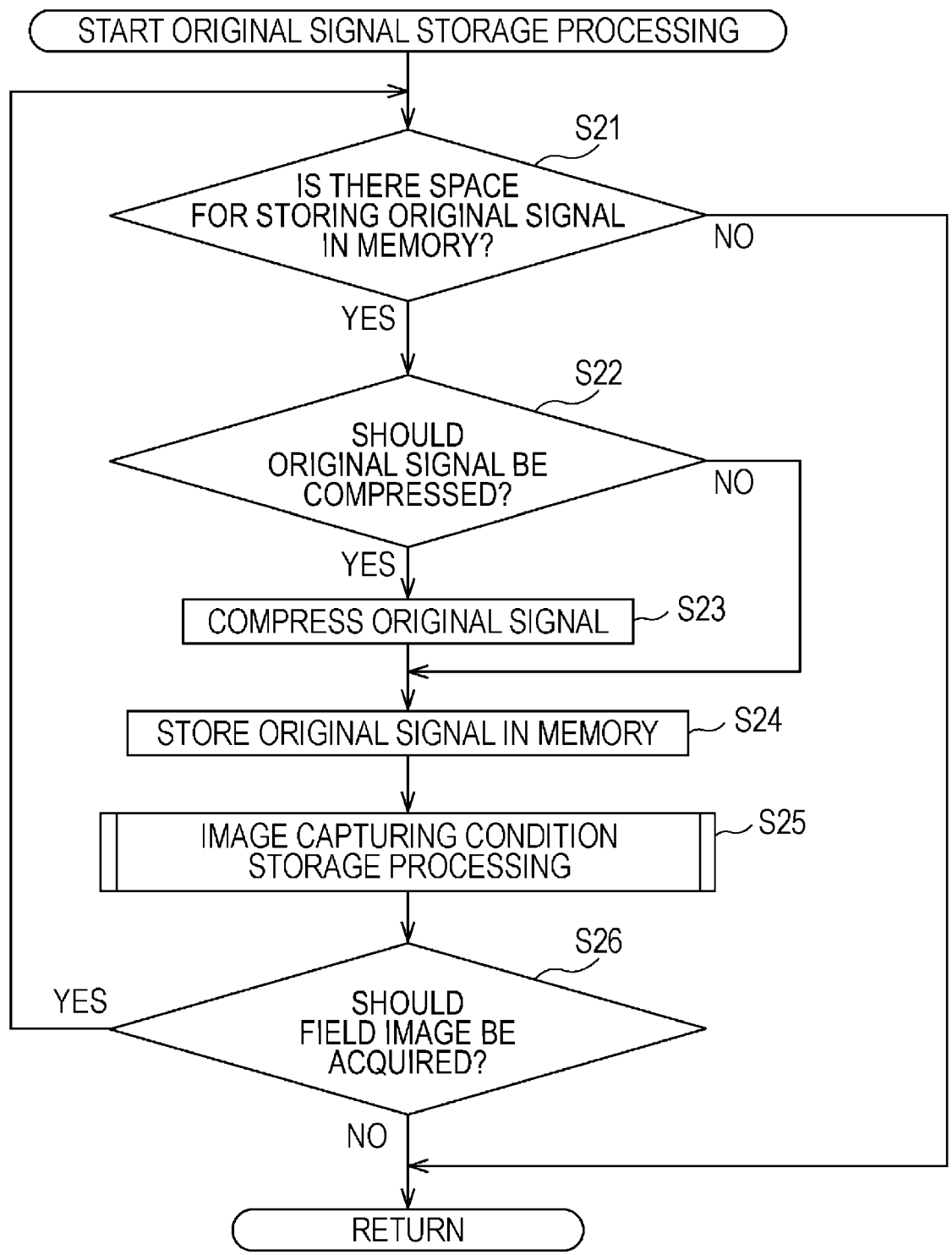
FIG. 9 is a flowchart describing original signal storage processing performed in step S5 shown in FIG. 7.

Next, the original signal storage processing performed in step S5 of FIG. 7 will be described with reference to the flowchart shown in FIG. 9.

In step S21, the system control circuit 81 determines whether there is space for storing the original signal in the memory 74. If it is determined that there is no space, for example, the system control circuit 81 causes the display 62 to display a message informing the user that no more still images can be captured, and ends the process. Subsequently, the process returns to step S5 of FIG. 7, and then the subsequent process is performed.

On the other hand, if it is determined that there is space for storing the original signal in the memory 74 in step S21, the process proceeds to step S22. In step S22, the system control circuit 81 determines whether the original signal should be compressed.

If it is determined that the original signal should be compressed in step S22, the process proceeds to step S23. In step S23, the system control circuit 81 causes the switch 71 to be connected and the switch 72 to be connected to the terminal b to transmit the original signal compressed by the original signal compression circuit 75 to the memory 74.

On the other hand, if it is determined that the original signal should not be compressed in step S22, the system control circuit 81 causes the switch 71 to be connected and the switch 72 to be connected to the terminal a. Subsequently, step S23 is skipped. Consequently, the original signal output from the image capturing section 12 is transmitted to the memory 74 without being compressed.

In step S24, the system control circuit 81 causes the memory I/F 73 to store the original signal (the compressed original signal or the non-compressed original signal) in the memory 74. Consequently, the original signal is stored in one of the areas $B_1$ through $B_N$ formed in the memory 74.

Figure 7:
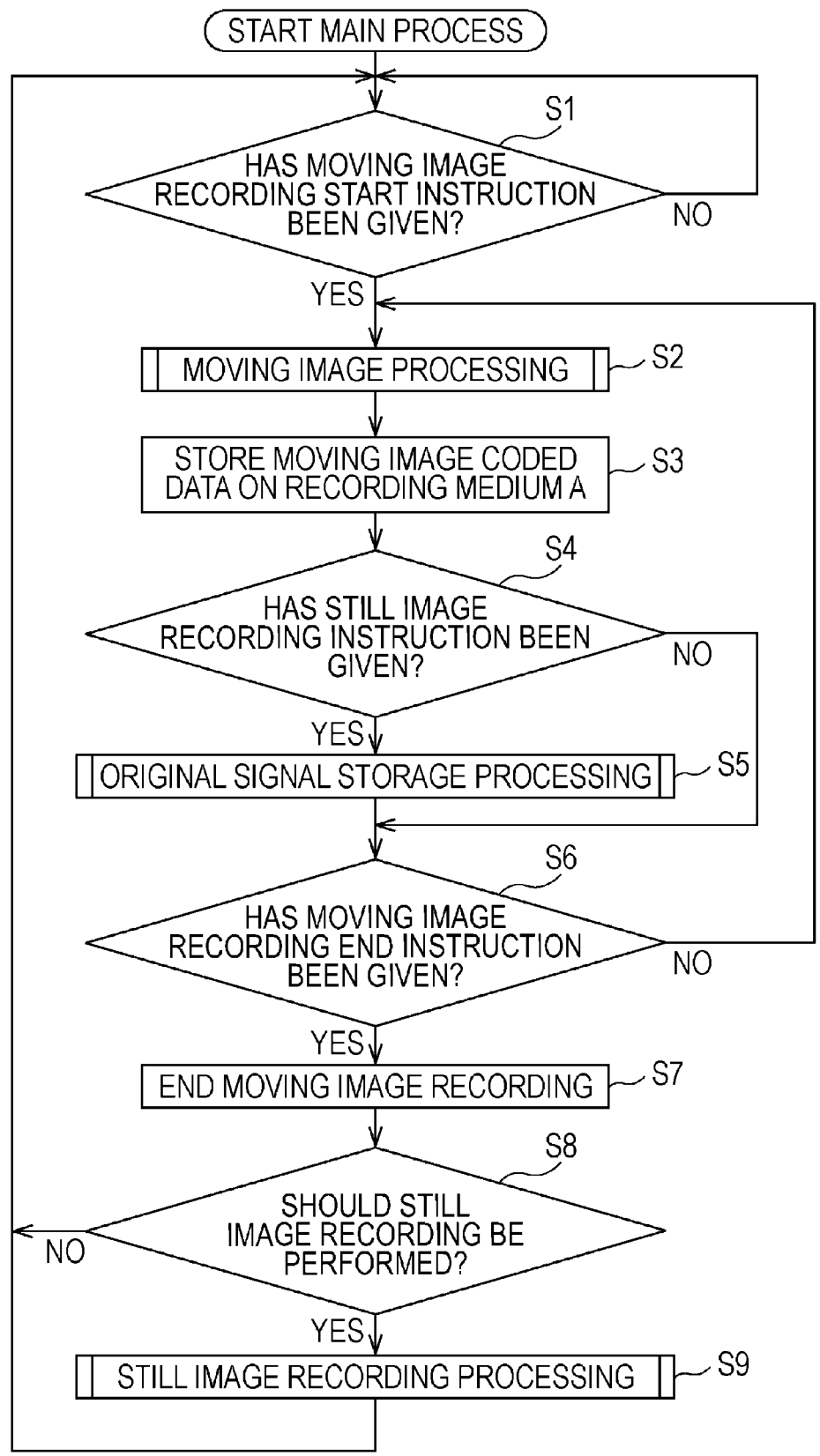
FIG. 7 is a flowchart describing the main process of the image pickup apparatus.
Figure 8:
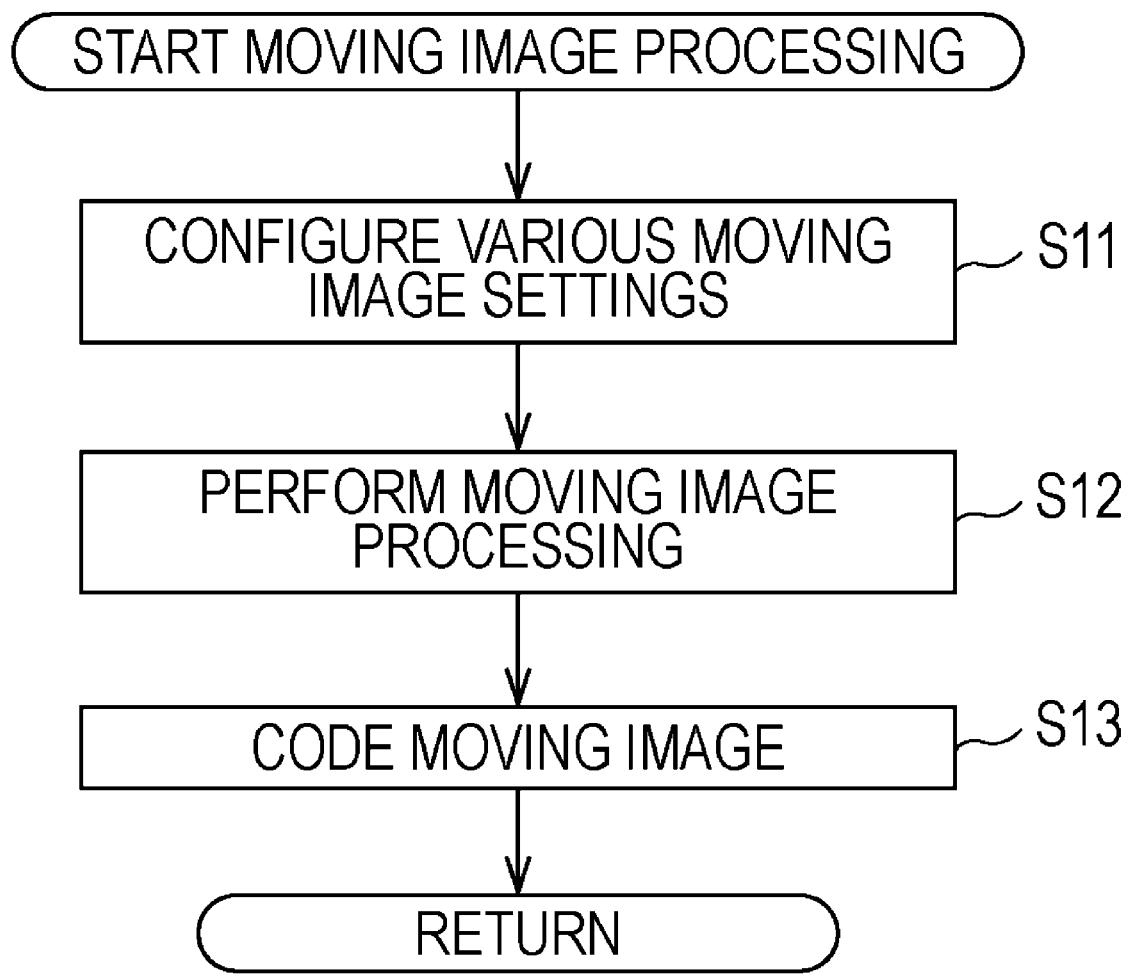
FIG. 8 is a flowchart describing moving image processing performed in step S2 shown in FIG. 7.

In step S25, the system control circuit 81 performs image capturing condition storage processing to uniquely associate image capturing conditions such as an aperture value and a zoom position of the moving image recording, which was started in step S2 of FIG. 7 and is currently being performed, with the original signal stored in step S24, and to store the image capturing conditions associated with the original signal in the memory 82. The details of the image capturing condition storage processing will be described later with reference to the flowchart shown in FIG. 10.

In step S26, the system control circuit 81 determines that it should acquire a field image.

For example, if the interlace scanning format is adopted for the image pickup device 21, and if original signals of two fields for generating a single still image have not been stored in the memory 74, the system control circuit 81 determines that it should acquire the field images in step S26. Subsequently, the process returns to step S21, and then the subsequent process is repeated.

On the other hand, if the progressive scanning format is adopted for the image pickup device 21, or if the interlace scanning format is adopted for the image pickup device 21 and the original signals of two fields have been already stored in the memory 74, the system control circuit 81 determines that it should not acquire a field image in step S26, and ends the process. Subsequently, the process returns to step S5 of FIG. 7, and then the subsequent process is performed.

Figure 10:
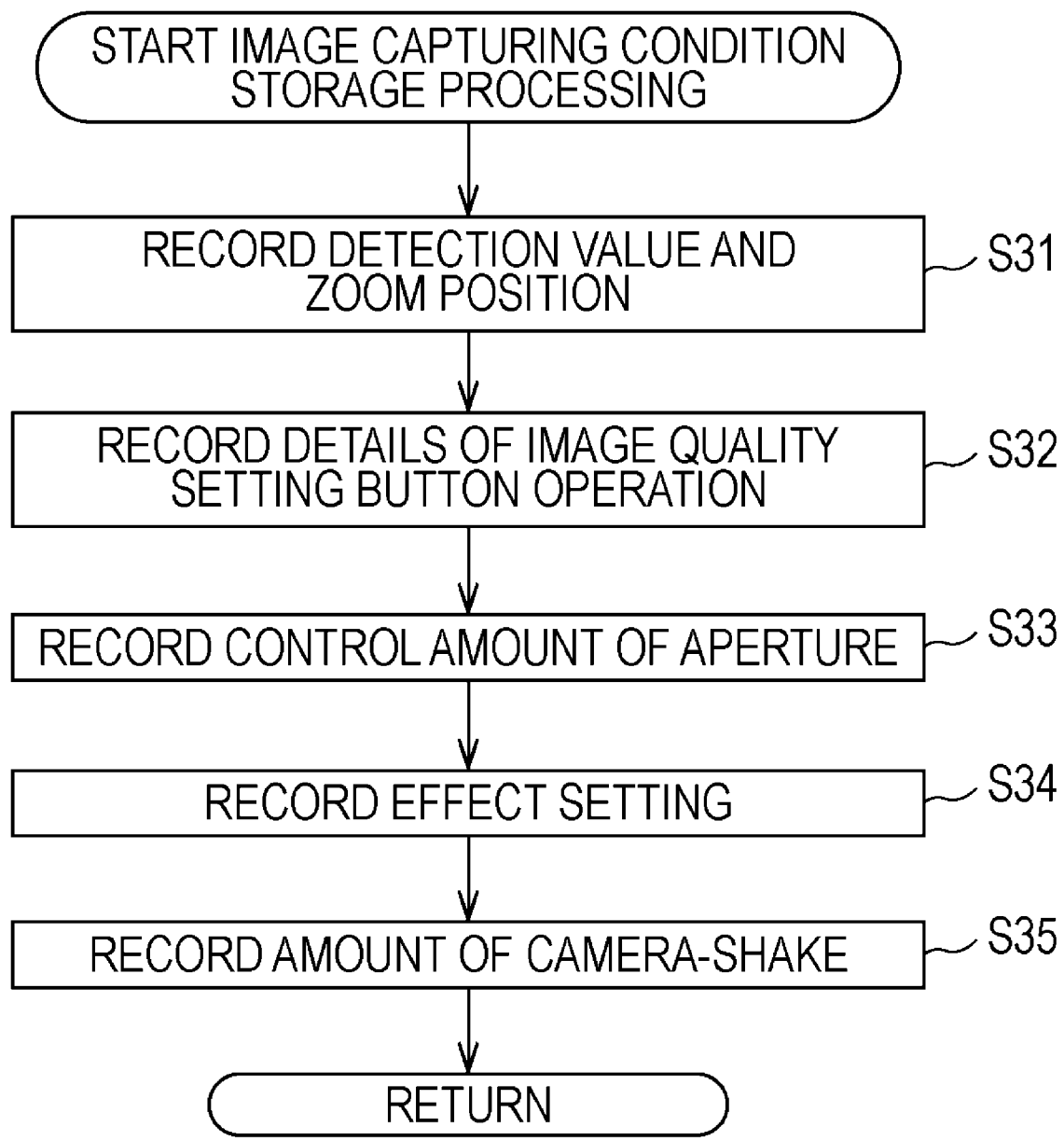
FIG. 10 is a flowchart describing image capturing condition storage processing performed in step S25 shown in FIG. 9.

Next, the image capturing condition storage processing performed in step S25 of FIG. 9 will be described with reference to the flowchart shown in FIG. 10.

In step S31, the system control circuit 81 causes the memory 82 to record information representing a detection value and a zoom position. In step S32, if it is determined that the user has operated an image quality setting button, the system control circuit 81 causes the memory 82 to record information representing the details of the image quality setting.

In step S33, the system control circuit 81 causes the memory 82 to record the control amount of aperture. In step S34, if the user captures a moving image so that a predetermined effect can be applied to the captured moving image, the system control circuit 81 causes the memory 82 to record information representing the effect setting.

In step S35, the system control circuit 81 causes the memory 82 to record the amount of camera-shake, and ends the process. Subsequently, the process returns to step S25 of FIG. 9, and then the subsequent process is performed.

Information recorded in the above-described processing will be used to decide parameters for specifying still image processing.

Next, the still image recording processing performed in step S9 of FIG. 7 will be described with reference to the flowchart shown in FIG. 11.

In step S41, the system control circuit 81 performs image capturing condition reading processing and still image parameter setting processing to read out the image capturing conditions stored in the memory 82, and to set still image parameters that have been decided on the basis of the read image capturing conditions for individual units included in the image processing section 13. At that time, as the moving image recording has been completed, processing performed in the image processing section 13 can be switched from moving image processing to still image processing. The details of the image capturing condition reading processing and still image parameter setting processing will be described later with reference to the flowchart shown in FIG. 12.

In step S42, the system control circuit 81 determines whether the original signal recorded in the memory 74 has been compressed. If it is determined that the original signal has been compressed, the process proceeds to step S43.

In step S43, the system control circuit 81 causes the switch 72 to be connected to the terminal b to transmit the original signal recorded in the memory 74 to the original signal compression circuit 75 and causes the original signal compression circuit 75 to decompress the compressed original signal.

On the other hand, if it is determined that the original signal has not been compressed in step S42, step S43 is skipped, and then the process proceeds to step S44.

In step S44, the system control circuit 81 reads out the original signal recorded in the memory 74 and transmits the read original signal to the image processing section 13. Consequently, the non-compressed original signal recorded in the memory 74 is transmitted via the switches 72 and 71 to the image processing section 13, and the original signal acquired by causing the compressed signal to be decompressed by the original signal compression circuit 75 is transmitted via the switch 71 to the image processing section 13.

In step S45, the system control circuit 81 causes individual units included in the image processing section 13 to perform still image processing upon the signal that has been temporarily recorded. If the original signal read from the memory 74 is a signal compliant with the interlace format, a generated signal acquired by causing the image processing section 13 to perform the still image processing upon the signal is output to the IP conversion circuit 51. If the original signal read from the memory 74 is a signal compliant with the progressive format, a generated signal acquired by causing the image processing section 13 to perform the still image processing upon the signal is output to the memory I/F 73.

In step S46, the system control circuit 81 determines whether there is a field image.

For example, if the interlace scanning format is adopted for the image pickup device 21, and if original signals of two fields for generating a single still image have been recorded in the memory 74, the system control circuit 81 determines that there are field images in step S46. Subsequently, the process proceeds to step S47. In step S47, the system control circuit 81 causes the IP conversion circuit 51 to perform IP conversion upon the original signals of two fields upon which the image processing section 13 has performed the still image processing. If the interlace scanning format is adopted for the image pickup device 21, and if the original signals of two fields for generating a single still image have been recorded in the memory 74, the process from step S41 to step S45 is repeated two times to generate a single still image. Subsequently, the process proceeds from step S47.

On the other hand, if the progressive scanning format is adopted for the image pickup device 21, the system control circuit 81 determines that there is no field image in step S46. Subsequently, step S47 is skipped, and then the process proceeds to step S48.

In step S48, the system control circuit 81 causes the still image compression circuit 52 to code the generated still image. The still image coded data generated by the still image compression circuit 52 is transmitted via the memory I/F 73 to the memory 74, and is then temporarily recorded in the memory 74.

In step S49, the system control circuit 81 determines whether all still images have been processed. If it is determined that all still images have not been processed, the process returns to step S41, and then the subsequent process is repeated.

On the other hand, if it is determined that all still images have been processed in step S49, the process proceeds to step S50. In step S50, the system control circuit 81 transfers the still image coded data from the memory 74 to the recording medium B to record the still image coded data on the recording medium B. Consequently, all still images, each of which has been generated on the basis of an original signal or original signals, are recorded on the recording medium B at the same time. For example, after all the original signals have been deleted from the memory 74, the process proceeds from step S9 of FIG. 7.

Next, the image capturing condition reading processing and the still image parameter setting processing performed in step S41 of FIG. 11 will be described with reference to the flowchart shown in FIG. 12.

In step S61, the system control circuit 81 sets a parameter specifying resolution conversion performed by the resolution conversion circuit 33 and a parameter specifying gamma correction performed by the filtering and gamma correction circuit 31 so that these parameters can be used for still image processing.

In step S62, the system control circuit 81 decides the control amount of AGC (Automatic Gain Control) on the basis of the information representing the detection value and the zoom position which has been recorded in the memory 82, and sets the decided control amount of AGC for an AGC control circuit included in the image processing section 13.

In step S63, the system control circuit 81 decides the control amount of white balance on the basis of the information representing the detection value and the details of the image quality setting performed by the user which has been recorded in the memory 82, and sets the decided control amount of white balance for a white balance control circuit (the filtering and gamma correction circuit 31) included in the image processing section 13.

In step S64, the system control circuit 81 decides the control amount of sharpness on the basis of the information representing the control amount of aperture which has been recorded in the memory 82, and sets the decided control amount of sharpness for a sharpness control circuit included in the image processing section 13.

In step S65, the system control circuit 81 decides the type of effect to be applied on the basis of the information representing the effect settings which has been recorded in the memory 82, and controls an effect applying circuit included in the image processing section 13 so that the effect applying circuit can apply the effect of the decided type.

In step S66, the system control circuit 81 decides the control amount of extraction (a pixel area used to generate a still image of the whole image area represented by the original signal) on the basis of the information representing the amount of camera-shake which has been recorded in the memory 82 and sets the decided control amount of extraction for an extraction area control circuit included in the image processing section 13.

Subsequently, the process returns to step S41 of FIG. 11, and then the subsequent process is performed. In step S45 of FIG. 11, still image processing specified by the parameters that have been set as above is performed.

Next, another still image recording processing performed in step S9 of FIG. 7 will be described with reference to the flowchart shown in FIG. 13.

Figure 11:
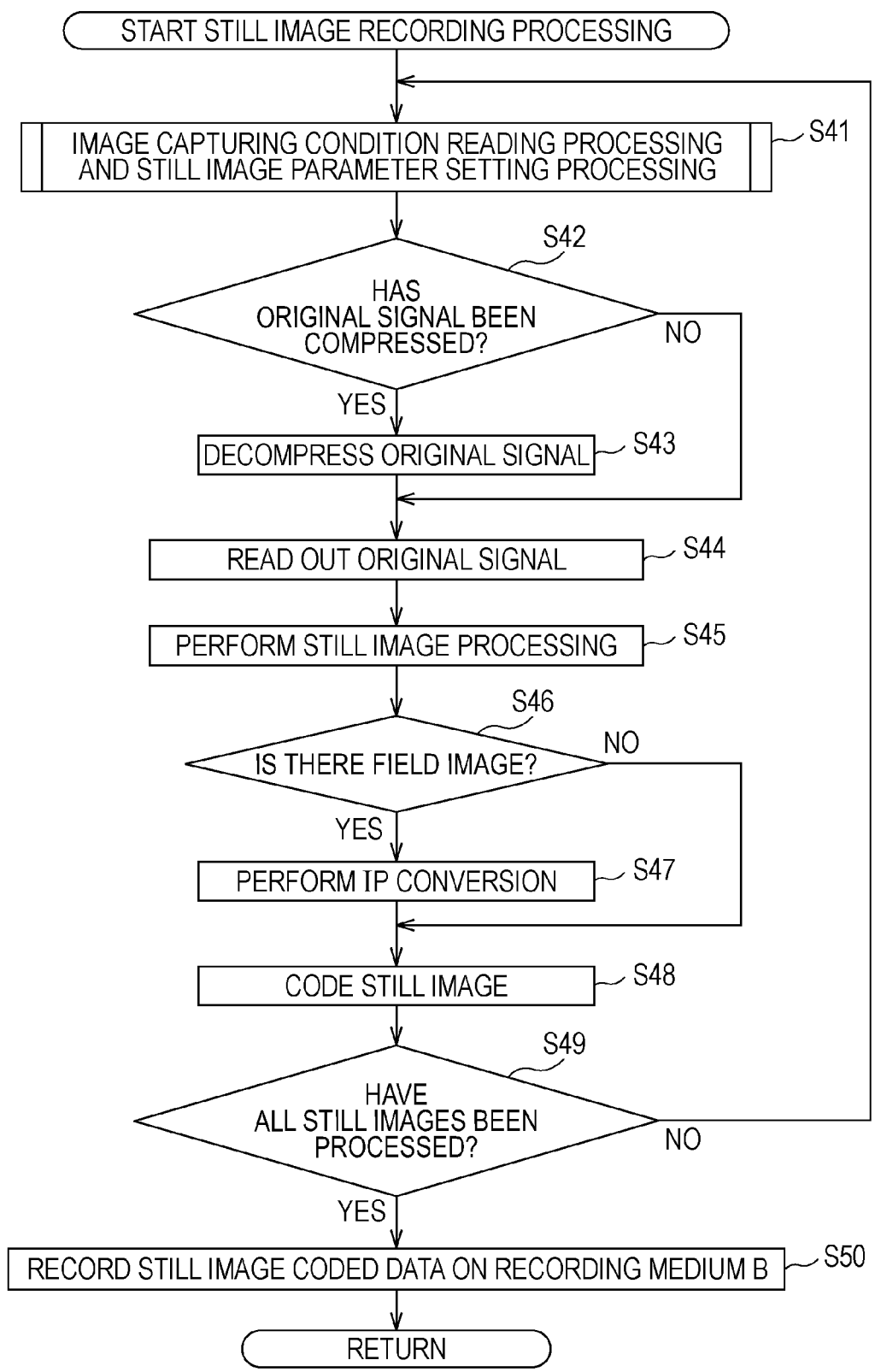
FIG. 11 is a flowchart describing still image recording processing performed in step S9 shown in FIG. 7.
Figure 13:
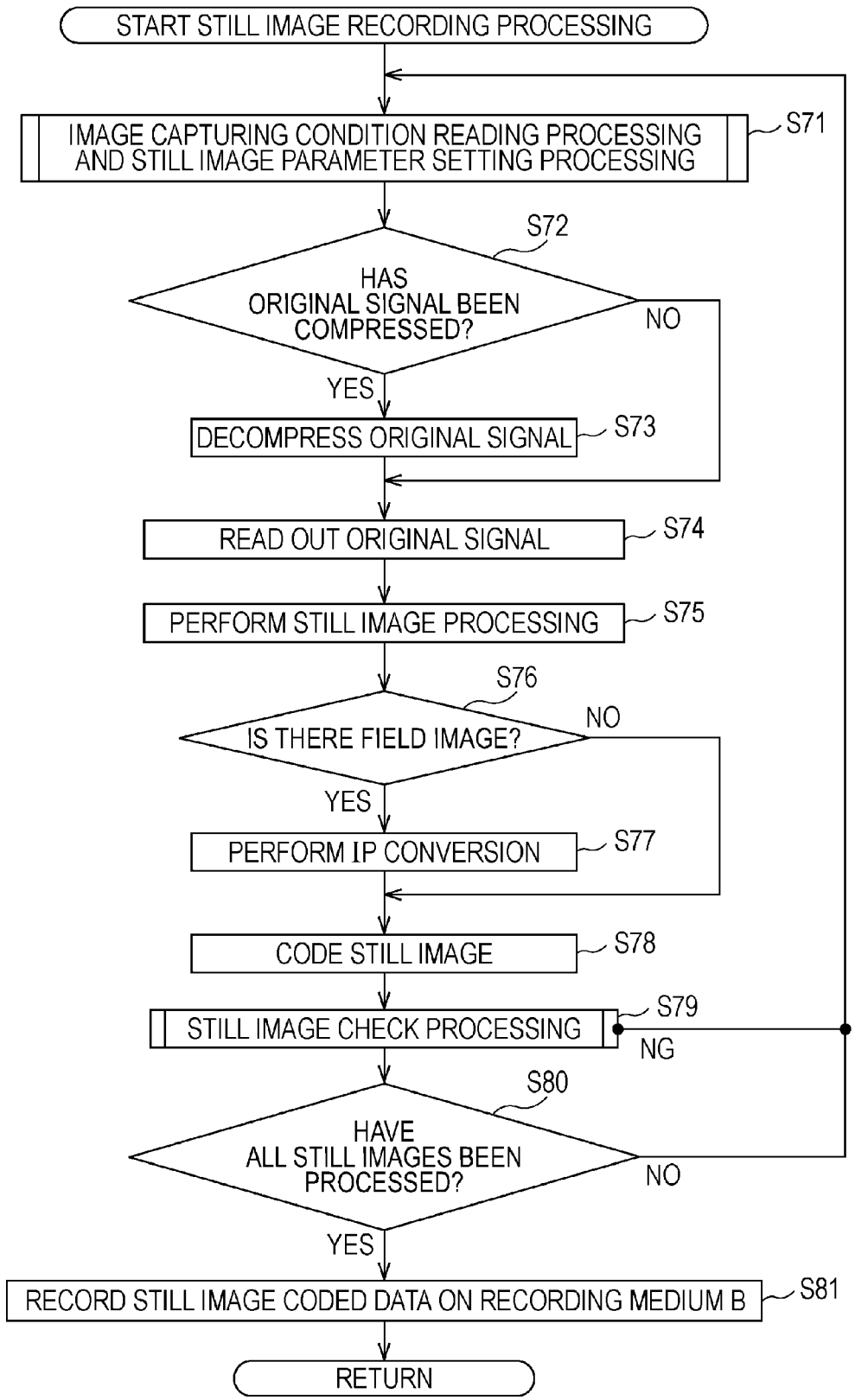
FIG. 13 is a flowchart describing another still image recording processing performed in step S9 shown in FIG. 7.

The still image recording processing of FIG. 13 is the same as the still image recording processing of FIG. 11 with the exception that each time a single still image is generated, the generated still image is presented to the user as described previously with reference to FIG. 6.

Figure 12:
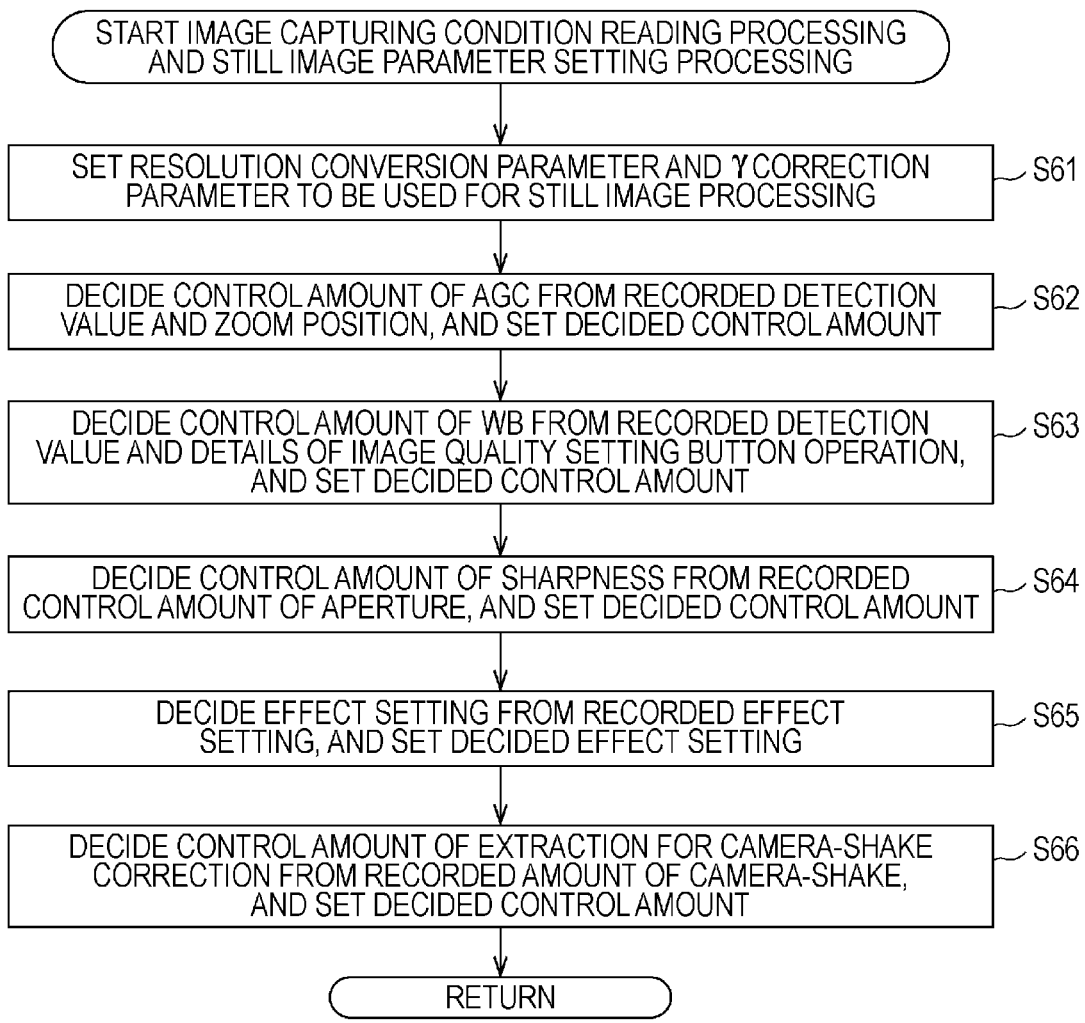
FIG. 12 is a flowchart describing image capturing condition reading processing and setting processing performed in step S41 shown in FIG. 11.

That is, in step S71, the system control circuit 81 performs the image capturing reading processing and the still image parameter setting processing (the processing of FIG. 12). In step S72, the system control circuit 81 determines whether the original signal recorded in the memory 74 has been compressed.

If it is determined that the original signal has been compressed in step S72, the process proceeds to step S73. In step S73, the system control circuit 81 causes the compressed original signal to be decompressed. If it is determined that the original signal has not been compressed in step S72, step S73 is skipped.

In step S74, the system control circuit 81 reads out the original signal recorded in the memory 74, and transmits the read original signal to the image processing section 13. In step S75, the system control circuit 81 causes individual units included in the image processing section 13 to perform still image processing upon the transmitted original signal.

In step S76, the system control circuit 81 determines whether there is a field image. If it is determined that there is a field image, the process proceeds to step S77. In step S77, the system control circuit 81 causes the IP conversion circuit 51 to perform IP conversion to generate a single still image. If it is determined that there is no field image, step S77 is skipped. Here, as described previously, if the interlace scanning format is adopted for the image pickup device 21, and if original signals of two fields used to generate a single still image have been recorded, the process from step S71 to step S75 is repeated two times, and then the process proceeds from step S77.

In step S78, the system control circuit 81 causes the still image compression circuit 52 to code the generated still image. Subsequently, the process proceeds to step S79.

In step S79, the system control circuit 81 performs still image check processing to cause the user to check the still image generated on the basis of the original signal or original signals. The details of the still image check processing will be described later with reference to the flowchart shown in FIG. 14.

In step S80, the system control circuit 81 determines whether all still images have been processed. If it is determined that all still images have not been processed, the process returns to step S71, and then the subsequent process is repeated. If it is determined that all still images have been processed, the process proceeds to step S81. In step S81, the system control circuit 81 transfers the still image coded data recorded in the memory 74 to the recording medium B to record the still image coded data on the recording medium B. Subsequently, the process returns to step S9 of FIG. 7, and the subsequent process is performed.

Figure 14:
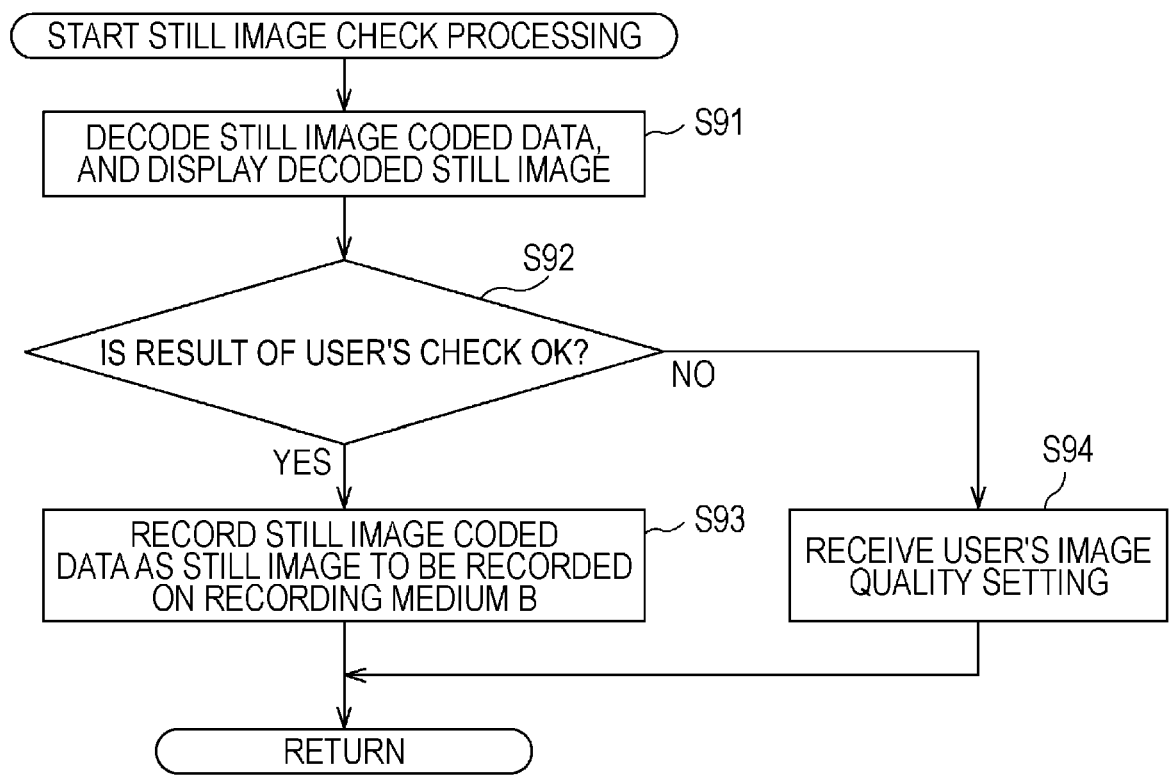
FIG. 14 is a flowchart describing still image check processing performed in step S79 shown in FIG. 13.

Next, the still image check processing performed in step S79 of FIG. 13 will be described with reference to the flowchart shown in FIG. 14.

In step S91, the system control circuit 81 causes the still image compression circuit 52 to decode the still image coded data that has been generated on the basis of the original signal and has been temporarily recorded in the memory 74, and causes the display control circuit 61 to display the decoded still image on the display 62. As described previously, a display screen that allows the user to instruct the image pickup apparatus 1 to store the generated still image or to regenerate a still image by changing parameters is displayed on the display 62.

In step S92, the system control circuit 81 determines whether the user has instructed the image pickup apparatus 1 to store the presented still image. If it is determined that the user has instructed the image pickup apparatus 1 to store the presented still image, the process proceeds to step S93. In step S93, the system control circuit 81 stores the still image coded data corresponding to the presented still image in the memory 74 as a still image to be recorded on the recording medium B. When all still images have been checked, a plurality of pieces of still image coded data corresponding to all the still images are transferred to the recording medium B and are then recorded on the recording medium B.

Subsequently, the process returns to step S79 of FIG. 13, and then the process proceeds from step S80.

On the other hand, if it is determined that the user has not instructed the image pickup apparatus 1 to store the presented still image in step S92, that is, the user has instructed the image pickup apparatus 1 to regenerate a still image by changing parameters, the process proceeds to step S94. In step S94, the system control circuit 81 receives image quality settings from the user. For example, the user can change parameters for a title addition function, gain control, color correction, etc., and the system control circuit 81 receives the image quality settings selected by the user.

Subsequently, the process returns to step S79 of FIG. 13. As the user has instructed the image pickup apparatus 1 to regenerate a still image by changing parameters, the process proceeds from step S71. In the still image parameter setting performed in step S71, the parameters received in step S94 (the parameters selected by the user) are set.

Thus, the user can cause the image pickup apparatus 1 to repeatedly generate a still image by controlling parameters until the user is satisfied with the quality of the generated still image.

According to the above-described processing flow, moving image processing and still image processing can be achieved in a single configuration, and therefore, the circuit size of the image pickup apparatus 1 can be smaller than that of an apparatus that has two configurations, a configuration for performing moving image processing, and a configuration for performing still image processing.

In addition, a user can obtain a high-quality still image during moving image recording without loss of moving image quality. An original signal is output from the image pickup device 21 in a moving image capturing cycle, and a still image is generated on the basis of the original signal. Accordingly, a user can capture a still image in the moving image capturing cycle, thereby preventing the loss of a shutter release opportunity in comparison with the case (Japanese Unexamined Patent Application Publication No. 2002-44531) in which an imaging signal having a resolution higher than that of a moving image is output every N times (N≧2) of a moving image capturing cycle to capture a still image.

In this embodiment, when the original signal is saved, the image capturing conditions are recorded in the memory 82 different from the memory 74 in which the original signal is recorded. However, the image capturing conditions may be recorded in the memory 74 along with the original signal. Furthermore, in this embodiment, information described with reference to FIG. 10 is recorded as the image capturing conditions. However, other various pieces of information capable of being used as references to decide parameters for specifying still image processing may be recorded.

Still furthermore, in this embodiment, still image processing is started at the time when moving image processing is stopped in accordance with a user's moving image recording end instruction. However, for example, the still image processing may be started at any time while the image processing section 13 does not perform the moving image processing, for example, at the time when moving image recording is suspended.

The above-described processing flow can be performed by hardware or software. If the processing flow is performed by software, a program configuring the software is installed from a program recording medium on a computer embedded in a piece of dedicated hardware or, for example, on a general-purpose personal computer that is allowed to perform various functions by installing various programs thereon.

FIG. 15 is a block diagram showing an exemplary configuration of a personal computer that performs the above-described processing flow using a program. A CPU (Central Processing Unit) 201 performs various pieces of processing in accordance with a program stored in a ROM (Read-Only Memory) 202 or a storage unit 208. A RAM 203 stores a program executed by the CPU 201 and data as appropriate. The CPU 201, the ROM 202, and the RAM 203 are connected to each other via a bus 204.

The CPU 201 is also connected to an input/output interface 205 via the bus 204. The input/output interface 205 is connected to an input unit 206 configured with a keyboard, a mouse, and a microphone, and an output unit 207 configured with a display and a speaker. The CPU 201 performs various pieces of processing in accordance with instructions input from the input unit 206, and outputs the result of processing to the output unit 207.

The storage unit 208 connected to the input/output interface 205 is configured with, for example, a hard disk, and stores a program executed by the CPU 201 and various pieces of data. A communication unit 209 communicates with an external apparatus via a network such as the Internet or a local area network.

When a removable medium 211 such as a magnetic disk, an optical disc, or a semiconductor memory is attached to a drive 210 connected to the input/output interface 205, the drive 210 drives the removable medium 211 to acquire a program or data recorded thereon. The acquired program or data is transferred to the storage unit 208 as appropriate, and is then recorded in the storage unit 208.

As shown in FIG. 15, the program recording medium storing the program to be installed on the computer and to be executed by the computer includes: the removable medium 211 that is a package medium such as a magnetic disk (including a flexible disk), an optical disc (including a CD-ROM (Compact Disc-Read-Only Memory) and a DVD (Digital Versatile Disc)), a magneto-optical disk, or a semiconductor memory; the ROM 202 in which the program is temporarily or permanently stored; and the hard disk configuring the storage unit 208. The storage of the program on the program recording medium is performed via the communication unit 209 that is an interface such as a router or a modem using a wired or wireless communication medium such as a local area network, the Internet, or digital satellite broadcasting as appropriate.

In this description, the steps describing the program to be stored in the program recording medium do not have to be executed in chronological order described above. The steps may be concurrently or individually.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup apparatus comprising:
   a circuit to enable a user to select a desired one of still image recording for recording a still image or moving image recording for recording moving images;
   an image capturing lens device to capture a desired image or images;
   a circuit to receive the captured image or images and to form a raw digital signal therefrom;
   a circuit to perform one or more processing operations on the raw digital signal in accordance with a number of parameters to form a processed signal;
   a circuit to compress the processed signal in accordance with a predetermined compression standard; and
   a circuit to determine whether a selection for the still image recording has been provided after selecting the moving image recording and while moving image processing pertaining thereto is being performed.

2. The image pickup apparatus according to claim 1, further comprising a memory to store data representative of the raw digital signal and to supply the same to the processing operations circuit.

3. The image pickup apparatus according to claim 1, in which the one or more processing operations include a white balance processing operation.

4. The image pickup apparatus according to claim 1, in which the one or more processing operations include an image size processing operation.

\* \* \* \* \*